(12) United States Patent
Kazmi et al.

(10) Patent No.: US 12,191,966 B2
(45) Date of Patent: Jan. 7, 2025

(54) ADAPTING CHANNEL MONITORING PATTERNS UNDER POWER SAVING

(71) Applicant: Telefonaktiebolaget LM Ericsson (publ), Stockholm (SE)

(72) Inventors: Muhammad Ali Kazmi, Sundbyberg (SE); Santhan Thangarasa, Vällingby (SE); Kazuyoshi Uesaka, Kanagawa (JP); Sina Maleki, Malmö (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 18/031,910

(22) PCT Filed: Oct. 22, 2021

(86) PCT No.: PCT/EP2021/079424
§ 371 (c)(1),
(2) Date: Apr. 14, 2023

(87) PCT Pub. No.: WO2022/084546
PCT Pub. Date: Apr. 28, 2022

(65) Prior Publication Data
US 2023/0396302 A1 Dec. 7, 2023

Related U.S. Application Data

(60) Provisional application No. 63/104,104, filed on Oct. 22, 2020.

(51) Int. Cl.
*H04B 7/06* (2006.01)
*H04W 52/02* (2009.01)
(52) U.S. Cl.
CPC ...... *H04B 7/0695* (2013.01); *H04W 52/0251* (2013.01)

(58) Field of Classification Search
CPC .. H04B 7/0695; H04W 52/0251; Y02D 30/70
(Continued)

(56) References Cited

U.S. PATENT DOCUMENTS

| 2005/0002363 A1* | 1/2005 | Cheng | H04L 1/1848 714/48 |
| 2015/0043355 A1* | 2/2015 | Kim | H04L 1/1867 370/241 |

(Continued)

FOREIGN PATENT DOCUMENTS

| WO | WO-2018202310 A1 * | 11/2018 |
| WO | 2020092498 A1 | 5/2020 |

OTHER PUBLICATIONS

Mediatek Inc., "Revised WID UE Power Saving Enhancements for NR," 3GPP TSG RAN meeting #88e, RP-200938, Electronic Meeting, Jun. 29-Jul. 3, 2020, 5 pages.

(Continued)

*Primary Examiner* — Emmanuel Bayard
(74) *Attorney, Agent, or Firm* — Sage Patent Group

(57) ABSTRACT

A communication device configured to operate in a communications network that includes a network node can determine that the communication device will perform a radio link procedure ("RLP") in a mode of operation. The communication device can further determine information associated with a channel monitoring pattern ("CMP") based on determining that the communication device will perform the RLP in the mode of operation. The communication device can further monitor a channel between the network node and the communication device based on the information associated with the CMP.

20 Claims, 10 Drawing Sheets

---

Determine that the communication device will perform a radio link procedure in a mode of operation
810

Determine information associated with a channel monitoring pattern based on determining that the communication device will perform the radio link procdure in the mode of operation
820

Monitor a channel between the network node and the communication device based on the information associated with the channel monitoring pattern
830

Perform the radio link procedure in the relaxed mode of operation
840

(58) Field of Classification Search
USPC .......................................................... 375/262
See application file for complete search history.

(56) References Cited

U.S. PATENT DOCUMENTS

| | | | | |
|---|---|---|---|---|
| 2020/0260418 | A1* | 8/2020 | Xue ...................... | H04W 72/04 |
| 2021/0385675 | A1* | 12/2021 | Maattanen et al. ... | H04W 76/28 |
| 2022/0022064 | A1* | 1/2022 | Raghavan ............. | H04W 24/10 |
| 2022/0150917 | A1* | 5/2022 | Wang .................... | H04W 16/14 |
| 2022/0201515 | A1* | 6/2022 | Chatterjee ............. | H04L 1/0038 |
| 2023/0189387 | A1* | 6/2023 | Jeon ...................... | H04W 72/23 |
| | | | | 370/242 |

OTHER PUBLICATIONS

3GPP TS 38.133 v16.4.0 (Jun. 2020), 3rd Generation Partnership Project; Technical Specification Group Radio Access NetWork; NR; Requirements for support of radio resource management (Release 16); 1463 pages.

3GPP TS 38.331 v16.2.0 (Sep. 2020); 3rd Generation Partnership Project; Technical Specification Group Radio Access NetWork; NR; Radio Resource Control (RRC) protocol specification (Release 16); 921 pages.

International Search Report and Written Opinion of the International Searching Authority, PCT/EP2021/079424, mailed Feb. 7, 2022, 12 pages.

Ericsson, "Reduced PDCCH monitoring for Redcap," 3GPP TSG-RAN WG1 Meeting #103-e, R1-2007530, e-Meeting, Oct. 26-Nov. 13, 2020, 20 pages.

Qualcomm Incorporated, "UE Complexity Reduction for NR RedCap Devices," 3GPP TSG-RAN WG1 Meeting #103, R1-2008620, e-Meeting, Oct. 26-Nov. 13, 2020, 21 pages.

3GPP TS 38.133 v16.5.0 (Sep. 2020); 3rd Generation Partnership Project; Technical Specification Group Radio Access Network; NR; Requirements for support of radio resource management (Release 16); 1608 pages.

Mediatek et al., "WF on NR UE Power Saving Enhancements, " 3GPP TS-RAN WG4 Meeting #98-bis-e, R4-2105797, Electronic Meeting, Apr. 12-20, 2021, 16 pages.

* cited by examiner

```
┌─────────────────────────────────────────────────────────────────────────┐
│ Determine that the communication device will perform a radio link       │
│ procedure in a mode of operation                                        │
│                                                                     810 │
└─────────────────────────────────────────────────────────────────────────┘
                                     │
                                     ▼
┌─────────────────────────────────────────────────────────────────────────┐
│ Determine information associated with a channel monitoring pattern      │
│ based on determining that the communication device will perform the     │
│ radio link procdure in the mode of operation                        820 │
└─────────────────────────────────────────────────────────────────────────┘
                                     │
                                     ▼
┌─────────────────────────────────────────────────────────────────────────┐
│ Monitor a channel between the network node and the communication        │
│ device based on the information associated with the channel monitoring  │
│ pattern                                                             830 │
└─────────────────────────────────────────────────────────────────────────┘
                                     │
                                     ▼
┌─────────────────────────────────────────────────────────────────────────┐
│ Perform the radio link procedure in the relaxed mode of operation       │
│                                                                     840 │
└─────────────────────────────────────────────────────────────────────────┘
```

FIG. 8

```
┌─────────────────────────────────────────────────────────────────────────┐
│ Determine that the communication device will perform a radio link       │
│ procedure in a mode of operation                                        │
│                                                                     910 │
└─────────────────────────────────────────────────────────────────────────┘
                                     │
                                     ▼
┌─────────────────────────────────────────────────────────────────────────┐
│ Determine information associated with a channel monitoring pattern      │
│ based on determining that the communication device will perform the     │
│ radio link procdure in the mode of operation                        920 │
└─────────────────────────────────────────────────────────────────────────┘
                                     │
                                     ▼
┌─────────────────────────────────────────────────────────────────────────┐
│ Transmit a message to the communication device including information    │
│ associated with at least one of: performing the radio link procedure    │
│ and the channel monitoring pattern                                  930 │
└─────────────────────────────────────────────────────────────────────────┘
```

FIG. 9

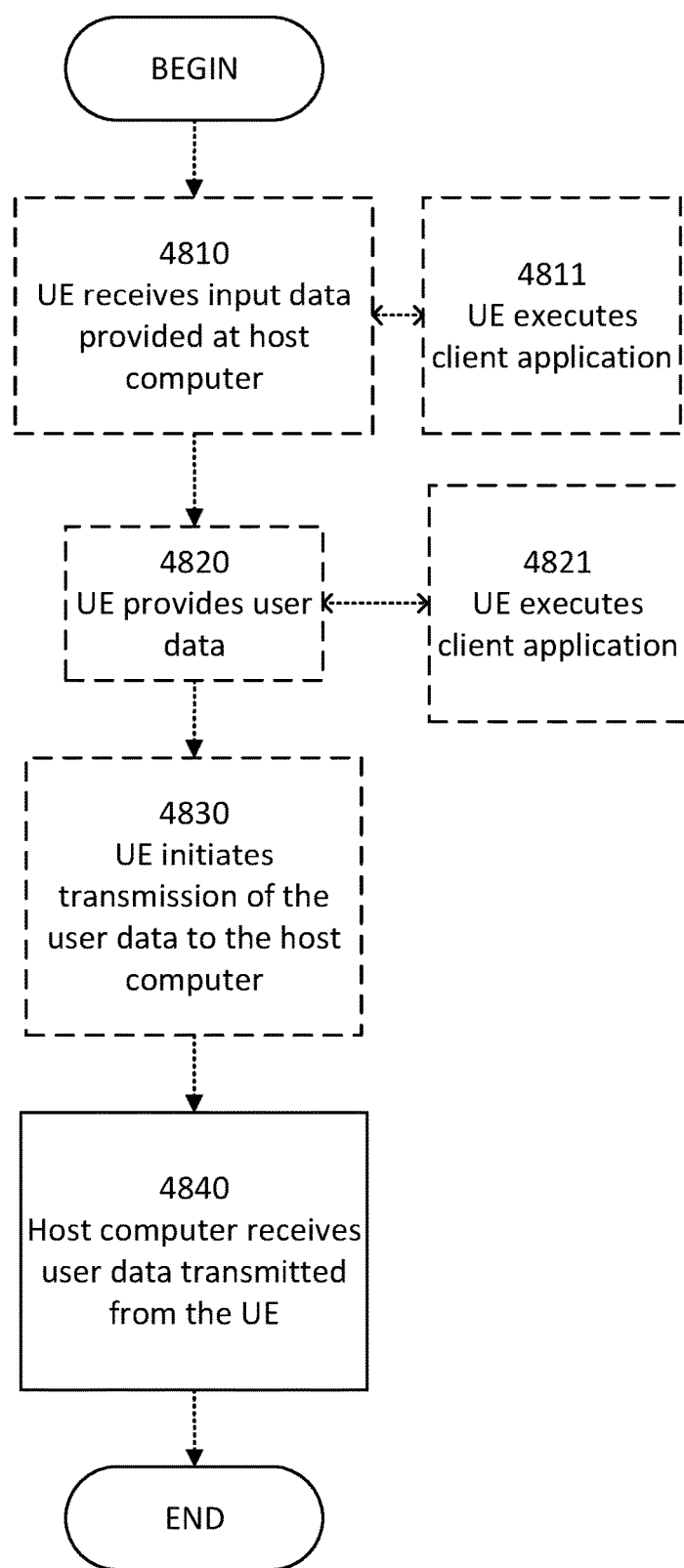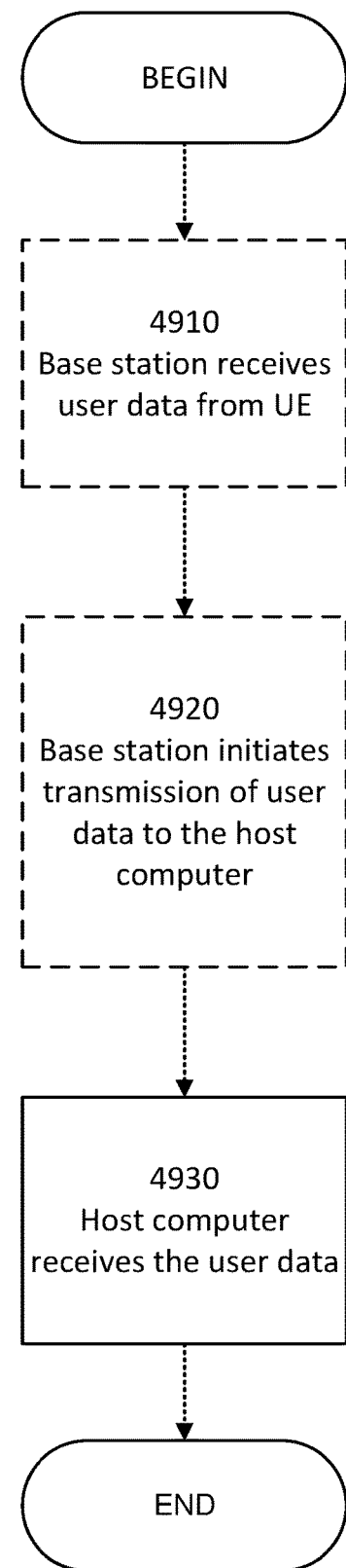
FIG. 17
FIG. 18

ADAPTING CHANNEL MONITORING PATTERNS UNDER POWER SAVING

CROSS REFERENCE TO RELATED APPLICATIONS

This application is a 35 U.S.C. § 371 national stage application of PCT International Application No. PCT/EP2021/079424 filed on Oct. 22, 2021, which in turn claims domestic priority to U.S. Provisional Patent Application No. 63/104,104, filed on Oct. 22, 2020, the disclosures and content of which are incorporated by reference herein in their entirety.

TECHNICAL FIELD

The present disclosure is related to wireless communication systems and more particularly to adapting channel monitoring patterns under power saving.

BACKGROUND

FIG. 1 illustrates an example of a $5^{th}$ Generation ("5G") network including a 5G base station ("gNB") 102 and multiple communication devices 104 (also referred to as user equipment ("UE")).

Radio link monitoring ("RLM") evaluation in new radio ("NR") is performed based on up to 8 RLM reference signal ("RLM-RS") resources configured by the network. In some examples, one RLM-RS resource can be either one synchronization signal ("SS")/physical broadcast channel ("PBCH") block or one channel state information reference signal ("CSI-RS") resource/port and the RLM-RS resources are UE-specifically configured.

SUMMARY

According to some embodiments, a method performed by a communication device configured to operate in a communications network that includes a network node is provided. The method can include determining that the communication device will perform a radio link procedure, RLP, in a mode of operation. The method can further include determining information associated with a channel monitoring pattern, CMP, based on determining that the communication device will perform the RLP in the mode of operation. The method can further include monitoring a channel between the network node and the communication device based on the information associated with the CMP.

According other embodiments, a method of operating a network node configured to operate in a communications network that includes a communication device is provided. The method can include determining that the communication device will perform a radio link procedure, RLP, in a mode of operation. The method can further include determining information associated with a channel monitoring pattern, CMP, based on determining that the communication device will perform the RLP in the mode of operation. The method can further include transmitting a message to the communication device, the message including information associated with at least one of: performing the RLP in the mode of operation, and the CMP.

According to other embodiments, a communication device is provided. The communication device is configured to operate in a communications network that includes a network node. The communication device includes processing circuitry and memory coupled to the processing circuitry. The memory has instructions stored therein that are executable by the processing circuitry to cause the communication device to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include monitoring a channel between the network node and the communication device based on the information associated with the CMP.

According to other embodiments, a network node is provided. The network node is configured to operate in a communications network that includes a communication device. The network node includes processing circuitry and memory coupled to the processing circuitry. The memory has instructions stored therein that are executable by the processing circuitry to cause the network node to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include transmitting a message to the communication device, the message including information associated with at least one of: performing the RLP in the mode of operation, and the CMP.

According to other embodiments, a communication device is provided. The communication device is configured to operate in a communications network that includes a network node. The communication device is adapted to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include monitoring a channel between the network node and the communication device based on the information associated with the CMP.

According to other embodiments, a network node is provided. The network node is configured to operate in a communications network that includes a communication device. The network node adapted to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include transmitting a message to the communication device, the message including information associated with at least one of: performing the RLP in the mode of operation, and the CMP.

According to other embodiments a computer program is provided. The computer program includes program code to be executed by processing circuitry of a communication device configured to operate in a communications network that includes a network node. Execution of the program code causes the communication device to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include monitoring a channel between the network node and the communication device based on the information associated with the CMP.

According to other embodiments, a computer program is provided. The computer program includes program code to be executed by processing circuitry of a network node configured to operate in a communications network that includes a communication device. Execution of the program code causes the network node to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include transmitting a message to the communication device, the message including information associated with at least one of: performing the RLP in the mode of operation, and the CMP.

According to other embodiments, a computer program product is provided. The computer program produce includes a non-transitory storage medium including program code to be executed by processing circuitry of a communication device configured to operate in a communications network that includes a network node. Execution of the program code causes the communication device to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include monitoring a channel between the network node and the communication device based on the information associated with the CMP.

According to other embodiments, a computer program product is provided. The computer program product includes a non-transitory storage medium including program code to be executed by processing circuitry of a network node configured to operate in a communications network that includes a communication device. Execution of the program code causes the network node to perform operations. The operations include determining that the communication device will perform a radio link procedure, RLP, in a mode of operation. The operations further include determining information associated with a channel monitoring pattern, CMP, based on determining that the communication device will perform the RLP in the mode of operation. The operations further include transmitting a message to the communication device, the message including information associated with at least one of: performing the RLP in the mode of operation, and the CMP.

Various embodiments described herein ensure that that the UE, while performing RLPs in relaxed mode, saves enough battery power but also receives and transmits data as soon as available in the UE/BS buffer. This may provide the potential advantage of reducing power consumption for a UE.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 is a flow chart illustrating an example of a process performed by a communication device according to some embodiments;

FIG. 9 is a flow chart illustrating an example of a process performed by a network node according to some embodiments;

FIG. 17 is a block diagram of methods implemented in a communication system including a host computer, a base station, and a user equipment in accordance with some embodiments; and FIG. 18 is a block diagram of methods implemented in a communication system including a host computer, a base station, and a user equipment in accordance with some embodiments.

DETAILED DESCRIPTION

Figure 1:
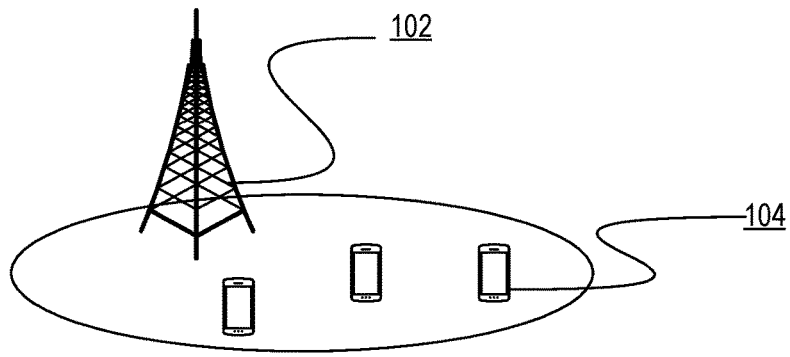
FIG. 1 is a schematic diagram illustrating an example of a $5^{th}$ generation ("5G") network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In some examples, when the UE is configured to perform RLM on one or multiple RLM-RS resources, periodic in-sync ("IS") is indicated if the estimated link quality corresponding to hypothetical physical downlink control channel ("PDCCH") block error rate ("BLER") based on at least 1 RLM-RS resource among all configured RLM-RS resource(s) is above $Q_{in}$ threshold.

In additional or alternative examples, when the UE is configured to perform RLM on one or multiple RLM-RS resources, periodic out-of-sync ("OOS") is indicated if the estimated link quality corresponding to hypothetical PDCCH BLER based on all configured RLM-RS resource(s) is below $Q_{out}$ threshold. In some examples, $Q_{out}$ and $Q_{in}$ are 10% and 2% respectively.

In additional or alternative examples, RLP is applicable for a PCell in stand alone ("SA") NR, NR-dual connectivity ("NR-DC"), and NR-evolved universal terrestrial radio access ("E-UTRA") dual connectivity ("NE-DC") operation mode and a PSCell in NR-DC and EN-DC operation mode.

A SS/PBCH block can include channels/signals (e.g., primary synchronization signal ("PSS"), secondary synchronization signal ("SSS"), PBCH, demodulation reference signal ("DMRS") for PBCH, CSI-RS, etc.) periodically for UE to synchronize with the network and to acquire channel information. Such channels/signals are transmitted at the same transmission burst called discovery reference signals ("DRS"). DRS can be transmitted by the base station periodically with certain periodicity, for example, 20 ms, 40 ms, 80 ms, or 160 ms. Each SSB or SSB-based measurement timing configuration window ("SMTC") occasion, which occurs periodically includes one or more SSB/PBCH signals. SMTC includes, for example, SS/PBCH blocks (or SSB), CSI-RS, PDSCH for transmitting system information block one ("SIB1"). The UE is configured with information about SSB on cells of a carrier and called as SSB-based measurement timing configuration (SMTC), which comprises SMTC periodicity, SMTC occasion length in time or duration, SMTC time offset with regard to reference time (e.g. serving cell's SFN).

The UE can be configured with one or more RLM-RS resources for each of which the UE can estimate the downlink radio link quality (e.g., signal-to-noise ratio ("SNR"), signal interference to noise ration ("SINR"), received signal reference power ("RSRP")), and compare it to the thresholds $Q_{out}$ and $Q_{in}$ (derived based on a hypothetical PDCCH BLER) for the purpose of monitoring downlink radio link quality of the cell. More specifically, the UE can evaluate whether the downlink radio link quality on the configured RLM-RS resource estimated over the last OOS evaluation period ($T_{Evaluate\_out}$) becomes worse than the threshold $Q_{out}$ within $T_{Evaluate\_out}$ evaluation period, and the UE can evaluate whether the downlink radio link quality on the configured RLM-RS resource estimated over the last IS evaluation period ($T_{Evaluate\_in}$) becomes better than the threshold $Q_{in}$ within $T_{Evaluate\_in}$ evaluation period.

In frequency range #2 ("FR2") (mm wave, for example, for frequencies between 24 GHz and 52.6 GHz), the RLM evaluation period additionally applies Rx beam sweeping factor, N, where it is assumed UE tries to receive RLM-RS with different Rx beam configuration to measure the RLM-RS. An example of N is 8. This means operations support systems ("OOS") and IS evaluation periods in FR2 are N times longer than the corresponding OOS and IS evaluation periods in frequency range #1 (FR1) (e.g. frequencies between 400 MHz and 7 GHz).

Beam management is a procedure to maintain the beam connection for transmission and reception. The beam management is also interchangeably called as link recovery procedure. The beam management broadly comprises one or more of beam related procedures e.g. beam establishment, beam failure recovery, and beam indication (or beam reporting).

Beam establishment is a procedure in which a UE selects the best (e.g., strongest) beam when it connects to the network. In order to identify the beam, the base station (gNB) transmits different SS/PBCH block and/or CSI-RS per beam. The beam establishment is usually performed at the same time UE performs the initial cell search. At the initial cell search, the UE searches for the strongest SS/PBCH block and identifies its location in the time domain, because it corresponds to the beam ID. After the UE find the beam, the UE try to connect to the network using this beam. While the UE connects to the network, the UE measure the downlink link quality of connecting beam. If the link quality level is below a threshold, the UE trigger the beam failure and start the beam recovery procedure.

Beam failure recovery is a procedure when the UE updates the beam in the same cell when the current beam becomes weak due to the channel condition changes, for example, UE location change or rotation. Beam indication is a procedure in which UE reports the beam condition (e.g., received signal power on the beam) to the network as CSI reporting.

A beam management procedure can be applicable for: PCell in SA, NR-DC, or NE-DC operation mode, PSCell in NR-DC and EN-DC operation mode, or SCell in carrier aggregation.

A beam recovery procedure is a procedure to recover beam connection when the beam UE is monitoring becomes weak. UE measures the channel quality of the periodic SS/PBCH block and/or CSI-RS resources (q0) in a serving cell. If the measured quality is below the threshold $Q_{out\_LR}$, corresponding to hypothetical PDCCH BLER of 10%, UE physical layer indicates beam failure to the MAC layer. This event is called beam failure detection (BFD).

In FR2, the BFD evaluation period additionally applies Rx beam sweeping factor, N, where it is assumed UE tries to receive RLM-RS with different Rx beam configuration to measure the BFD-RS. Example of N is 8. This means BFD evaluation period in FR2 is N times longer than the BFD evaluation period in FR1.

After BFD, the UE searches candidate beams from the configured CSI-RS and/or SS/PBCH block resources for candidate beam detection (q1) in the serving cell. UE determines one of the beams in q1 whose L1-RSRP exceeds the threshold rsrp-Threshold, signaled from the network. This procedure is called candidate beam detection (CBD).

After determining the new beam in PCell/PSCell, the UE reports the selected beam with the random access procedure, where the UE transmits random access preamble on the PRACH corresponding to the SS/PBCH block and/or CSI-RS resource. After determining the new beam in SCell, UE reports the selected beam with the Beam failure recovery ("BFR") message in MAC CE.

In FR2, the CBD evaluation period additionally applies Rx beam sweeping factor, N, where it is assumed that the UE tries to receive CBD-RS with different Rx beam configuration to measure the CBD-RS. Example of N is 8. N is the scaling factor depending on the configured cells as same as CBD evaluation in FR1. This means CBD evaluation period in FR2 is N times longer than the CBD evaluation period in FR1.

L1-RSRP reporting is a part of the CSI reporting procedure and UE reports the received power of the configured number of beams. The network uses the information to determine which beam is to be used to transmit data (PDCCH/PDSCH). L1-RSRP reporting is configured as periodic, aperiodic, or semi-persistent. For the periodic reporting, UE shall transmit L1-RSRP on PUCCH according to the periodicity configured by the network. For the aperiodic L1-RSRP reporting, UE shall transmit L1-RSRP on PUSCH after the UE receives CSI request in DCI. For the semi-persistent L1-RSRP reporting, UE shall transmit L1-RSRP reporting on PUSCH or PUCCH according to the periodicity specified by the higher layer. For the semi-persistent reporting the UE stops L1-RSRP reporting after the configured number of report transmissions. The reporting period is given by TReport.

In FR2, the L1-RSRP measurement period additionally applies Rx beam sweeping factor, N, where it is assumed UE tries to receive SSB with different Rx beam configuration to measure the SSB. Example of N is 8. This means L1-RSRP measurement period in FR2 is N times longer than the L1-RSRP measurement in FR1.

Similar to L1-RSRP reporting, L1-SINR reporting is also a part of the CSI reporting procedure and the UE reports the ratio of received power of the channel measurement resources ("CMR") and received power of the interference measurement resource ("IMR"). 3GPP assumes CMR is SSB or CSI-RS, and IMR is Non-zero-power CSI-RS ("NZP-CSI-RS") or zero-power CSI-RS ("ZP-CSI-RS").

In FR2, the L1-SINR measurement period additionally applies Rx beam sweeping factor, N, where it is assumed UE tries to receive SSB and IMR with different Rx beam configuration to measure the SSB and IMR. Example of N is 8. This means L1-SINR measurement period in FR2 is N times longer than the L1-SINR measurement in FR1.

Both L1-RSRP and L1-SINR reporting are part of beam indication or beam reporting.

UE power saving feature in NR can be configured to operate or perform one or more radio link procedures ("RLPs") (e.g., RLM, BM, etc) while meeting relaxed requirements provided certain power saving criteria are met for the UE (e.g. when UE operates in low mobility scenario, when configured with short DRX cycles). Relaxed RLP requirements imply that the UE performs measurements on reference signals (e.g. SSB, CSI-RS) more infrequently compared to the measurements done in legacy operation. For example, in relaxed operational mode the UE may measure 4 times less often than for the same type of RLP (e.g. RLM) in the normal (legacy) operational mode. In the normal operational mode, the UE can be configured to monitor the control channel (e.g. PDCCH) for example, DL data scheduling and UL grant, as often as in one or multiple resources in every slot, or during the ON duration of the DRX cycle (if DRX is configured). However, there will be no or minimal power saving if the UE monitors control channel (e.g. PDCCH) as in legacy (e.g. continuously) when performing one or more RLPs in relaxed node. On the other hand, it is also important that the UE is able to receive and/or transmit data whenever the data is available in the buffer. Therefore, a new mechanism is needed to ensure that the UE, while performing RLPs in relaxed mode, saves enough battery power but also receives and transmits data as soon as available in the UE/BS buffer.

Various embodiments described herein ensure that that the UE, while performing RLPs in relaxed mode, saves enough battery power but also receives and transmits data as soon as available in the UE/BS buffer.

In some embodiments, the UE obtains information that it is performing or is going to perform one or more radio link procedures (RLPs) (e.g. RLM, BM etc.) in relaxed mode, obtains information about a channel monitoring pattern (CMP) based on or associated with the one or more RLPs performed in relaxed mode, monitors the channel (e.g. PDCCH) based on the obtained channel monitoring pattern, and may further perform one or more RLPs in relaxed mode.

In additional or alternative embodiments, the UE obtains information whether it is performing or is going to perform one or more RLPs (e.g. RLM, BM etc.) in relaxed mode based on an indication from the network or autonomously. In some examples, the UE can receive an indication from the network (NW) node, which can determine that the UE operate the RLM in relaxed mode based on one or more criteria and informs the UE. In additional or alternative examples, the UE can autonomously determine whether it is performing or is going to perform one or more RLPs in a relaxed mode based on one or more pre-defined rules, which involves evaluation of one or more criteria. The criteria or one or more parameters related the criteria can be pre-defined or configured by the network node.

In additional or alternative embodiments, the UE obtains information about CMP based on one or more of: information about CMP is received from NW node e.g. NW determines the CMP (e.g. a bit map) and configures the UE with the CMP; and autonomously determined by the UE based on one or more pre-defined rules. For example, one or more CMPs associated with the RLPs operation in relaxed mode can be pre-defined (e.g. in specification), and applied by the UE when the UE performs the RLPs in relaxed node.

In additional or alternative embodiments, the criteria used by the UE and/or NW node for determining whether the UE can perform one or more RLPs in relaxed mode, or not including: UE speed e.g. Relaxation of RLPs allowed if the UE speed/mobility is low; UE location in a cell e.g. Relaxation of RLPs is allowed if the UE is not at the cell edge; UE speed and UE location in a cell e.g. Relaxation of RLPs if the UE speed/mobility is low, and, UE is not at the cell edge.

In some embodiments, a UE is able to achieve power saving when performing one or more RLPs in relaxed mode (e.g. meeting relaxed requirements). The UE behavior for monitoring control channel when performing one or more RLPs in relaxed mode can be well defined. The transmission of data from the network to the UE and reception of data from the UE to the network when the UE is performing one or more RLPs in relaxed mode, may not be delayed or the delay may be within an acceptable range (e.g. does not degrade the service performance).

Figure 5:
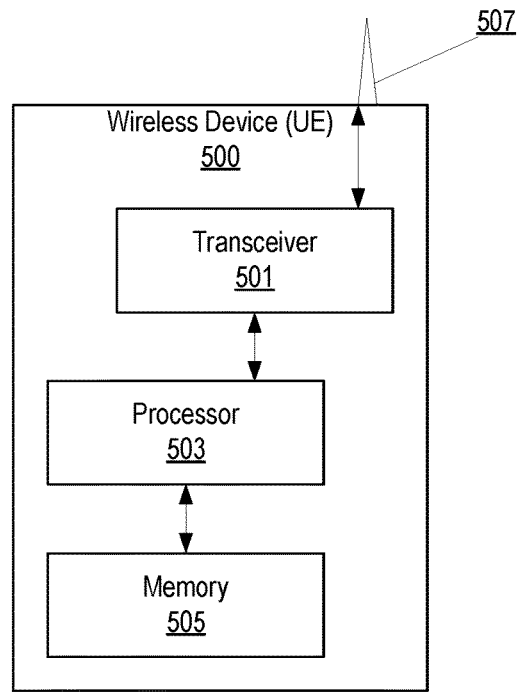
FIG. 5 is a block diagram illustrating an example of a wireless device ("UE") according to some embodiments of the present disclosure.

FIG. 5 is a block diagram illustrating elements of a wireless device UE 500 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 500 may be provided, for example, as discussed below with respect to wireless device 4110 of FIG. 16.) As shown, wireless device UE may include an antenna 507 (e.g., corresponding to antenna 4111 of FIG. 16), and transceiver circuitry 501 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16) of a radio access network. Wireless device UE may also include processing circuitry 503 (also referred to as a processor, e.g., corresponding to processing circuitry 4120 of FIG. 16) coupled to the transceiver circuitry, and memory circuitry 505 (also referred to as memory, e.g., corresponding to device readable medium 4130 of FIG. 16) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Wireless device UE may also include an interface (such as a user interface) coupled with processing circuitry 503, and/or wireless device UE may be incorporated in a vehicle.

As discussed herein, operations of wireless device UE may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations.

Figures 6, 7:
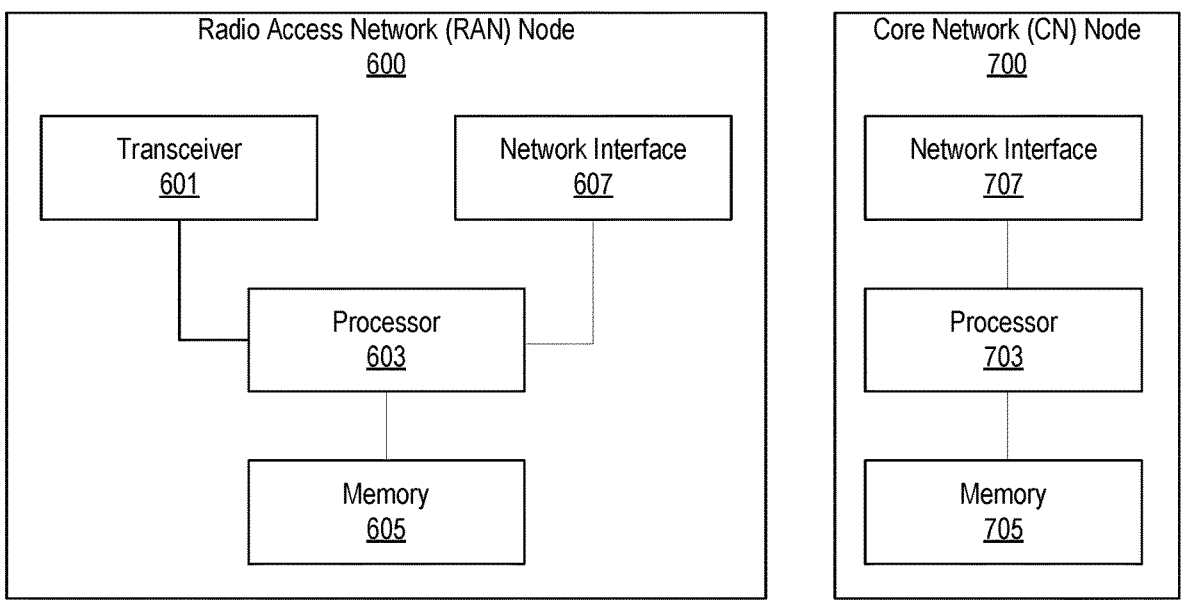
FIG. 6 is a block diagram illustrating an example of a radio access network ("RAN") node (e.g., a base station eNB/gNB) according to some embodiments of the present disclosure.
FIG. 7 is a block diagram illustrating an example of a core network ("ON") node (e.g., an AMF node, an SMF node, an OAM node, etc.) according to some embodiments of the present disclosure.

FIG. 6 is a block diagram illustrating elements of a radio access network RAN node 600 (also referred to as a network node, base station, eNodeB/eNB, gNodeB/gNB, etc.) of a Radio Access Network (RAN) configured to provide cellular communication according to embodiments of inventive concepts. (RAN node 600 may be provided, for example, as discussed below with respect to network node 4160 of FIG. 16.) As shown, the RAN node may include transceiver circuitry 601 (also referred to as a transceiver, e.g., corresponding to portions of interface 4190 of FIG. 16) including a transmitter and a receiver configured to provide uplink and downlink radio communications with mobile terminals. The RAN node may include network interface circuitry 607 (also referred to as a network interface, e.g., corresponding to portions of interface 4190 of FIG. 16) configured to provide communications with other nodes (e.g., with other base stations) of the RAN and/or core network CN. The network node may also include a processing circuitry 603 (also referred to as a processor, e.g., corresponding to processing circuitry 4170) coupled to the transceiver circuitry, and a memory circuitry 605 (also referred to as memory, e.g., corresponding to device readable medium 4180 of FIG. 16) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

FIG. 7 is a block diagram illustrating elements of a core network CN node 700 (e.g., an SMF node, an AMF node, a UDM node, a PCF node, a NEF node, a NRF node etc.) of a communication network configured to provide cellular communication according to embodiments of inventive concepts. As shown, the CN node 700 may include network interface circuitry 707 (also referred to as a network interface) configured to provide communications with other nodes of the core network and/or the radio access network RAN. The CN node 700 may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CN node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations.

In some embodiments a more general term "network node" is used and it can correspond to any type of radio network node or any network node, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g. MSC, MME, etc), O&M, OSS, SON, positioning node or location server (e.g. E-SMLC), MDT, test equipment (physical node or software), etc.

In some embodiments the non-limiting term user equipment (UE) or wireless device is used and it refers to any type of wireless device communicating with a network node and/or with another UE in a cellular or mobile communication system. Examples of UE are wireless device supporting NR, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

The term radio access technology, or RAT, may refer to any RAT e.g. UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The UE performs measurements on reference signal (RS). Examples of RS are discover signal or discovery reference signal (DRS), SSB, CSI-RS, TRS, CRS, DMRS, PSS, SSS etc. Examples of measurements are cell identification (e.g. PCI acquisition, cell detection), Reference Symbol Received Power (RSRP), Reference Symbol Received Quality (RSRQ), secondary synchronization RSRP (SS-RSRP), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, radio link quality, Radio Link Monitoring (RLM), which consists of Out of Synchronization (out of sync) detection and In Synchronization (in-sync) detection, Layer-1 RSRP (L1-RSRP), Layer-1 SINR (L1-SINR) etc.

The term radio link procedure (RLP) used herein may refer to any procedure performed by the UE on radio signals operating between UE and a cell e.g. between UE and a serving cell. Examples of serving cells are special cell (SpCell), secondary cell (SCell) etc. Examples of SpCell are primary cell (PCell), primary secondary cell (PSCell) etc. The carrier frequencies of SpCell, SCell, PCell and PSCell are called as special CC (SpCC) or simply SpC, secondary CC (SCC), primary CC (PCC) and primary secondary CC (PSCC) or simply PSC respectively. Examples of RLP are RLM, BM, one or more procedures related to RLM (e.g. out of sync and/or in-sync evaluation, radio link failure detection), one or more procedures related to BM (e.g. BFD, CBD, L1-RSRP reporting, L1-SINR reporting etc.), etc.

The term multicarrier (MC) operation used herein refer to any UE operation comprising two or more carrier frequencies. The carrier frequency is also called as component carrier (CC), frequency layer, frequency channel, serving carrier frequency etc. In one specific example the MC operation comprising UE configured with at least two serving cells where each serving cell operates on or belong to certain carrier frequency or CC. Examples of MC operations are carrier aggregation (CA), dual connectivity (DC), multi-connectivity (MuC) etc. CA comprising a PCell and at least one SCell. DC comprising a master cell group (MCG) which contains at least PCell and a secondary cell group (SCG). Each of MCG and SCG may further contain one or more SCells. PCell manages (e.g. configures, changes, release etc.) all SCells in MCG and PSCell in SCG. PSCell manages all SCells in SCG. The cells in MCG and SCG may belong to the same RAT (e.g. all cells are NR in both MCG and SCG like in NR-DC) or they may belong to different RATs (e.g. LTE cells in MCG and NR cells in SCG like in EN-DC or NR cells in MCG and LTE cells in SCG like in NE-DC).

The term relaxed operational mode or simply relaxed mode used herein refers to performing certain RLP, which is associated with one or more relaxed requirements compared to those associated with the normal operational mode or simply normal mode of the RLP. The normal mode (NM) is interchangeably called as legacy mode, mode without any relaxation etc. The corresponding requirements associated with NM are also called as reference requirements, legacy requirements, normal requirements etc. Examples of requirements are measurement time, measurement accuracy, measurement reporting periodicity, measurement etc. Examples of measurement time are evaluation period or measurement period e.g. L1 measurement period, L1-RSRP measurement period, L1-SINR measurement period, OOS evaluation period, IS evaluation period, BFD evaluation period, BFD evaluation period, L1 indication interval, IS indication interval, OOS indication interval, BFD indication interval etc. Examples of measurement accuracy are L1-RSRP accuracy (e.g. within ±X1 dB wrt reference L1-RSRP value), L1-SINR accuracy (e.g. within ±X2 dB wrt reference L1-SINR value).

In some embodiments, the UE obtains information that the UE is performing or is going to perform one or more radio link procedures (RLPs) (e.g. RLM, BM etc.) in relaxed mode, obtains information about a channel monitoring pattern (CMP) which is based on or is associated with the one or more RLPs being performed or is going to be performed by the UE in relaxed mode, monitors the channel (e.g. PDCCH) based on the obtained channel monitoring pattern (CMP), and may further perform one or more RLPs performed in relaxed mode.

The UE obtaining information for performing RLPs in relaxed mode is further described below. In some examples, the UE may obtain or acquire information whether the UE is performing or is going to perform or is expected to perform or will continue performing one or more RLPs in relaxed mode, or not, based on one of the following mechanisms: based on the configuration message received from the network node; and determined by the UE.

Examples of criteria for applying RLPs in relaxed mode are further described below. In some embodiments, criteria for determining whether the UE can perform one or more RLPs in relaxed mode include one of: UE speed; UE location in a cell; UE speed and UE location in a cell; variation in radio condition; cell change; beam changes; and multi-beam related issues.

In some examples, criteria for determining whether the UE can perform one or more RLPs in relaxed mode include UE speed. The UE performs RLPs in relaxed mode in a cell if the UE meets low mobility criterion in that cell; otherwise the UE is not allowed to perform the RLPs in relaxed mode in that cell. In one example low mobility criterion is met when the UE speed (V) is low. In one specific example UE speed is low if V is below certain speed threshold (Vh) (e.g. low mobility criterion is met if V<Vh). The UE speed can be expressed in terms of distance per unit time (e.g. Y1 km/hour) and/or in Doppler frequency (e.g. Y2 Hertz). In another example low mobility criterion is met when received signal level at the UE wrt the cell is static or quasi-static over certain time period (Ts). The received signal wrt the cell is static or quasi-static if it does not change by more than certain margin over certain time period, e.g., the variance of the measured signal levels is within a certain threshold. Examples of received signal are signal strength, path loss, RSRP, L1-RSRP, L1-SINR etc.

In some examples, criteria for determining whether the UE can perform one or more RLPs in relaxed mode include UE location in a cell. The UE performs RLPs in relaxed mode in a cell if the UE meets not-at-cell edge criterion in that cell; otherwise the UE is not allowed to perform the RLPs in relaxed mode in that cell. The not-at-cell edge criterion is met if the UE is not at the cell edge; otherwise not-at-cell edge criterion is not met. In one example the determination whether not-at-cell edge criterion is met or not is based on signal measurement wrt the cell. For example the UE meets not-at-cell edge criterion provided that the signal measurement value wrt the cell is above certain threshold; otherwise the UE does not meet the not-at-cell edge criterion. Examples of signal measurements are signal strength, path loss, RSRP, RSRQ, SNR, SINR, L1-RSRP, L1-SINR, CQI etc.

In some examples, criteria for determining whether the UE can perform one or more RLPs in relaxed mode include UE speed and UE location in a cell. The UE performs RLPs in relaxed mode in a cell if the UE meets both low mobility criterion and not-at-cell edge criterion in that cell; otherwise the UE is not allowed to perform RLPs in relaxed mode in that cell.

In some examples, criteria for determining whether the UE can perform one or more RLPs in relaxed mode include variation in radio condition. The UE performs RLPs in relaxed mode in a cell if the variation in the radio conditions for the UE in that cell do not change by more than certain margin over certain time; otherwise the UE is not allowed to perform RLPs in relaxed mode in that cell. The variation in the radio conditions can be determined by estimating the variation of the signal between the UE and that cell. Examples of parameters which can depict signal variation are multi-path delay spread, measured signal value, Doppler frequency etc. Examples of measured signal value are signal strength, signal quality etc. For example if the change in the Doppler frequency (Df) is less than or equal to Z1 Hertz over Tv time period in a cell then the UE is allowed to perform RLPs in relaxed mode in that cell; otherwise (i.e. if Df>Z1 over Tv) the UE is not allowed to perform RLPs in relaxed mode in that cell. On top of that if the change in the delay spread (Ds) is less than or equal to Z2 nano-seconds (ns) over Ts time period in a cell (i.e. if Df<=Z1 and Ds<=Z2 over Ts) then the UE is allowed to perform RLPs in relaxed mode in that cell; otherwise (i.e. if Df>Z1 or Ds>Z2 over Tv) the UE is not allowed to perform RLPs in relaxed mode in that cell.

In some examples, criteria for determining whether the UE can perform one or more RLPs in relaxed mode include cell changes. The UE performs RLPs in relaxed mode in a cell if the UE has not performed more than N1 cell changes over last T1 duration, where N1 and T1 can be configurable or predefined.

In some examples, criteria for determining whether the UE can perform one or more RLPs in relaxed mode include beam changes. The UE performs RLPs in relaxed mode in a cell if the UE has not performed more than X beam changes over last T_beam duration, where X and T_beam can be configurable or predefined. Alternately or in addition, the NW configures a set of beams (as a filter) in which it is allowed for the UE to perform RLPs in relaxed mode. Conversely, the NW might have configured a set of beams in which it is disallowed for the UE to relax RLPs.

In some examples, criteria for determining whether the UE can perform one or more RLPs in relaxed mode include multi-beam related issues. The UE performs RLPs in relaxed mode in a cell as in the examples above, if the criteria for relaxation is satisfied in all the beams, or in one or more specific beams. The applicability of the relaxation criteria to multi-beam case can be either pre-defined or configured by the NW, e.g., as part of the RLP configuration in relaxed mode, the NW can configure the UE with the appropriate multi-beam condition, e.g., the UE can perform RLPs in relaxed mode, if the configured criteria is satisfied in all the beams.

In some embodiments, the determination based on the above criteria can be done by the UE or by the network node as described below.

In some examples, the NW node itself determines whether the UE meets one or more criteria for performing one or more RLPs in relaxed mode, or not e.g. UE speed is below threshold, UE is not in cell edge, both UE speed is low and UE is not in cell edge, or based on signal variation, cell changes, beam changes etc. The NW node may use any one or more criteria for making the determination. For example the NW node may use one or more measurements performed by the UE (e.g. CQI, RSRP, RSRQ, SINR etc.) and/or by the NW node on signals operating between the UE and a cell, to determine whether the UE meets the criteria for performing one or more RLPs in relaxed mode, or not. The criteria evaluated in the NW need not necessarily be measurements-based, but also traffic related; e.g. the NW may consider allowing/disallowing the UE to relax in RLPs only based on whether the exchanged/foreseen traffic rate is low/high. The NW node then configures the UE with an indicator or configuration message informing the UE whether the criteria for performing one or more RLPs in relaxed mode, is met or not. The UE receives message from the network node that indicates or configures or informs the UE whether the UE is meeting one or more criteria for performing one or more RLPs in relaxed mode or not. The UE based on the received message then either performs the RLPs in relaxed mode or not. This is elaborated with the following examples:

In some examples, the indication or the configuration message transmitted by the NW node to the UE comprising for example YES or NO, 0 or 1, ON or OFF, Enabled or Disabled, etc. The message may further include additional information such as related to the cell (e.g. cell identifier (e.g. PCI, CGI, carrier frequency information (e.g. NR-ARFCN, GSCN, beam index, channel number etc.)) in which the UE can perform RLPs in relaxed mode or not, type of RLP which can be performed in relaxed mode or not etc. In one example the indicator, YES (0, ON, or Enable), informs that the UE is meeting the criteria for performing the RLP in relaxed mode, and NO (1, OFF, or Disable) means the UE is not meeting (or not meeting any more) the criteria for performing the RLP in relaxed mode. The indication, NO (1, OFF or Disable), forbids the UE from performing RLP in relaxed mode or stops the UE from continue performing RLP in relaxed mode (if that RLP is being performed in relaxed mode) e.g. apply one or more RLPs meeting normal (legacy) requirements. In indication, can be as part of a higher layer signaling configurations, e.g., RLP configuration, or alternatively, it can be based on L1 signaling, e.g., as part of an existing DCI, e.g., a scheduling DCI, DCI format 2-6, and so on (either as an independent bitfield, or implied by referring to a reserved index, or implied as a result of a specific indication within the DCI, e.g., an indication to skip the upcoming ON duration in a DCI format 2-6). The indication can also be based on an L2 signaling, e.g., MAC-CE command to activate or deactivate RLP operation in relaxed mode.

In additional or alternative examples, indication or the configuration message transmitted by the NW node to the UE comprising certain pattern of channel resources e.g. a CMP which is associated with certain RLP performed in relaxed mode (association as described later below). When the UE is configured with such pattern by the NW node then the UE can perform the related RLP (associated with the pattern) in relaxed mode. When the UE is configured with a pattern of channel resources, which is not related to or associated with RLP operation in relaxed node then the UE stops performing the RLP in relaxed mode. In this case the UE may further start performing the RLP in the normal mode. E.g., the UE is configured with a specific C-DRX configuration which is either based on pre-definition or NW configuration, is considered as a CMP which can be associated with RLP. E.g., if the C-DRX cycle length is below a specific threshold, or if the ON duration timer is below a specific threshold, then the UE can apply RLPs in relaxed mode, but if not, then the UE cannot unless another qualifying criteria is met. Herein, the criteria can be more refined, e.g., the UE can only perform RLPs in relaxed mode, for a specific number of C-DRX cycles, e.g., once every K cycle, the UE has to perform normal RLPs. This condition can be either pre-defined or configured by the NW. In another example, the UE may be configured or indicated with a minimum SS or PDCCH monitoring periodicity, which is above a specific threshold. Alternately, the NW might have configured allowing/disallowing of relaxed RLPs as part of the Search Space Configuration; e.g. a sparse search space at the level that the NW sees suitable is configured with a parameter allowing for relaxed RLPs. In these cases, the UE can apply RLPs in relaxed mode, otherwise it cannot, unless another qualifying criterion is met. The threshold can be in terms of a number of slots, ms, etc. In another example, the UE may be configured or indicated, e.g., by L1 signaling to skip monitoring PDCCH for a specific duration of time or based on a specific pattern. Again, in this case the UE may be allowed to apply RLPs in relaxed mode. In another example, the UE is configured with a DCI format 2-6 (or a wake-up signal) outside active time. In one approach, if the UE is not indicated to monitor PDCCH in the next ON duration, the UE can perform RLPs in relaxed mode, otherwise it can not unless other qualifying criteria are met. Again, here the UE behavior can be either pre-defined, or configured by the NW, e.g., if the UE receives indication of skipping more than M number of consecutive ON durations using DCI format 2-6, then the UE has to perform normal RLP in at least the next occasion.

In additional or alternative examples, there may be higher/lower layer procedures (either defined in the specifications or configured) during which the UE is not allowed to relax RLPs. For example, the UE may despite all fulfilled relaxing requirements not be allowed to relax in case of ongoing Public Warning Systems reception. Other example of procedures could be during pre-defined/configured periods after the UE is granted in the UL/DL. Alternately, any of these procedure cancel the relaxed RLPs until further notice from the NW.

In some embodiments, the UE determines whether the UE can perform one or more RLPs based on criteria. In some examples, the UE evaluates one or more criteria (e.g. provided above) for determining whether the UE can perform one or more RLPs in relaxed mode, or not. However, criteria and/or associated parameters can be pre-defined or configured by the NW node as explained below.

In some examples, the one or more criteria used for the determination by the UE are pre-defined. The criteria can be different for different RLPs or they can be the same for two or more RLPs (e.g. RLM, BM etc.).

In additional or alternative examples, the UE can be configured with one or more criteria and/or one or more related parameters (e.g. signal threshold values, speed threshold values) by the NW node. The UE uses them to evaluate and based on the evaluation determines whether the UE can perform one or more RLPs in relaxed mode, or not. The NW node can configure different set of criteria and/or related parameters for different RLPs or the same set of criteria and/or related parameters for two or more RLPs (e.g. RLM, BM etc.).

In some embodiments, further rules may be pre-defined or configured by the NW node how often the UE evaluates the criteria. In some examples, the UE evaluates the one or more criteria periodically e.g. UE evaluated the criteria once every T1 time period. T1 can be pre-defined, configured by the network node or is up to UE implementation. In additional or alternative examples, the UE evaluates the one or more criteria upon triggering one or more conditions, which can be pre-defined, configured by the network node or autonomously determined by the UE e.g. when UE battery power falls below certain threshold, when the UE is configured with certain criteria or parameter for the evaluation etc. In additional or alternative examples, the UE evaluates the one or more criteria upon receiving a message from the network node e.g. message allowing the UE to relax one or more requirements to enable UE power saving.

In some embodiments, the UE obtains information about channel monitoring pattern related to RLPs in relaxed mode. In some examples, the UE obtains information about at least one channel monitoring pattern (CMP) which is related to or is associated with one or more RLPs being performed or is going to be performed or can be performed in relaxed mode. An example of channel is a control channel, downlink control information (DCI) etc. Examples of control channels are PDCCH, PBCH etc. As an example, CMP is PDCCH monitoring pattern, or control channel search space.

The CMP can include a pattern of resources (time-frequency), which repeat in time with certain periodicity. The CMP may have a starting reference time e.g. SFN, subframe number, slot number etc. The CMP may be valid for certain time duration or may apply until it is de-configured e.g. via higher layer signaling, or MAC-CE based activation/deactivation, or L1 based signaling.

In some examples, the CMP includes a pattern of DL control channel (e.g. PDCCH or DCI) e.g. time-frequency resources where the UE monitors the DL control channel. In this case the UE is configured by the network via higher layer (e.g. RRC) with the pattern defined by the information element: ControlResourceSet (CORESET) and the SearchSpace. For example the CORSET configures the UE with at least the frequency domain resources of the DL control channel per time unit, (e.g. 1 slot) and the SearchSpace configures the UE with time domain occurrence of the DL control channel. For example the UE can be configured to monitor one or multiple PDCCH candidates as fast as in every slot or as sparse as once every 12560 slots.

The association or relation between the CMP and the one or more RLPs in relaxed mode can be determined by one or more rules. The rules can be pre-defined or determined by the NW node. In some examples, the CMP is used by the UE, while performing RLP in relaxed mode, should allow the UE to monitor the channel less often than while performing RLP in normal mode. In additional or alternative examples, the CMP allows the UE to relax the channel monitoring proportional to the relaxation applied to one or more requirements related to the RLP performed in relaxed mode. For example in the UE in relaxed mode, monitors the channel less often than in normal mode and the frequency of the channel monitoring is proportional to the extended RLP measurement time (Tm) e.g. IS/OOS evaluation period. For example assume that when performing certain RLP in relaxed mode, the Tm is expressed by Tm=K*T0, where T0 is the RLP measurement time in normal mode and K(K≥1) i.e. Tm is the RLP measurement time in relaxed mode extended by a factor of K compared to that in normal mode. In this case CMP is relaxed by factor of K*L. For example when performing RLP in relaxed mode the UE monitors control channel 1/K*L times compared to legacy case (when performing RLM in normal mode). Scaling factor L can be pre-defined or configured by the NW. Examples of K are: 2, 4, 8 etc. Examples of L are: ¼, ½, etc. As special case L=1. In the case of K=8 and L=½, UE monitors ¼ of control channel monitoring occasion compared to the normal mode. In additional or alternative examples, a set of existing CMP configurations are linked to or associated with one or more RLPs in relaxed mode. For example only CMP with periodicity longer than certain threshold are applicable for the UE when the UE performs RLPs in relaxed mode.

In some embodiments, the UE obtains information about one or more CMPs based on the information being pre-defined or by receiving a configuration message from the network node. In some examples, one or more CMPs are pre-defined in the standard. One or more CMPs can be associated with one or more RLPs in relaxed mode. In this case the association is pre-defined. In one example one CMP can be associated with RLM performed in relaxed mode, another CMP can be associated with BM performed in relaxed mode, yet another CMP can be associated with BM and RLM performed in relaxed mode etc. In additional or alternative examples, the NW node determines the one or more CMPs and transmits the information about the CMPs to the UE. The determination can also be based on one or more rules, which can be pre-defined or determined by the NW node, e.g., by data traffic condition. For example, the CMP used for monitoring the channel, while performing RLP in relaxed mode, should allow the UE to monitor the channel less often than while performing RLP in normal mode. The CMPs can be configured any time e.g. before, during or after the UE obtains information that it meets the criteria for performing RLPs in relaxed mode.

Figure 2:
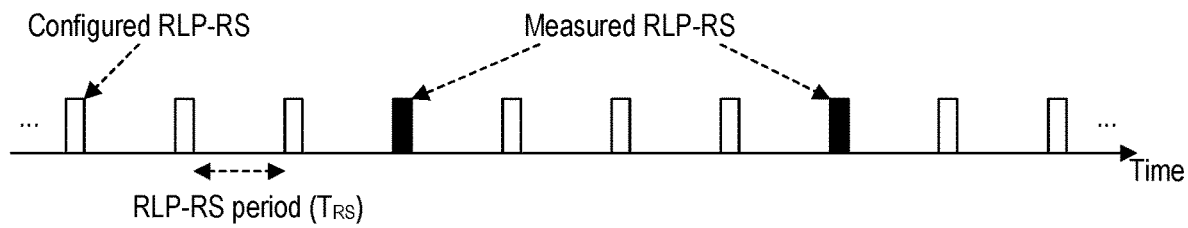
FIG. 2 is a schematic diagram illustrating an example showing the UE performing RLP in relaxed mode uses only a subset of RLP resources configured for that RLP according to some embodiments.
Figure 3:
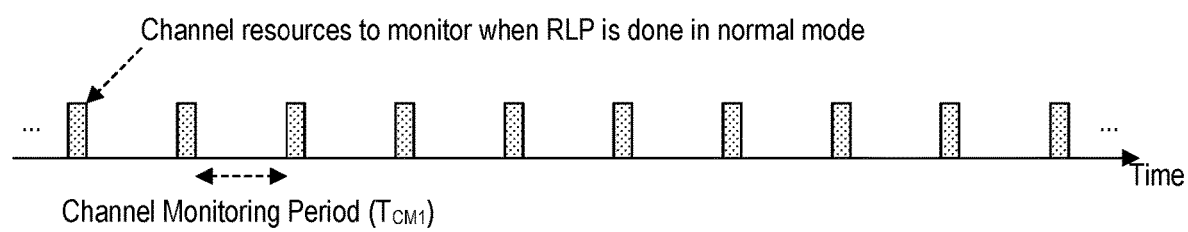
FIG. 3 is a schematic diagram illustrating an example showing the UE is configured with a CMP to monitor a channel when the UE is performing RLP in normal mode according to some embodiments.
Figure 4:
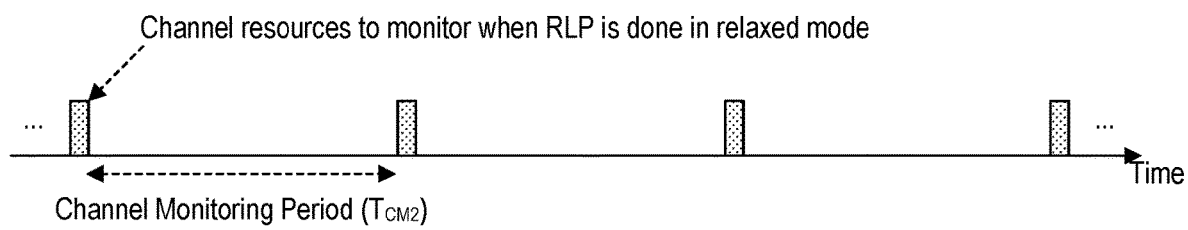
FIG. 4 is a schematic diagram illustrating an example showing the UE is configured with a CMP to monitor a channel when the UE is performing RLP in relaxed mode according to some embodiments.

In some embodiments, the association between the CMP and the RLP operation in relaxed mode is further elaborated with the following example. FIG. 2 shows an example where the UE is configured with RLP resources or resource set (RLP-RS) which occurs with certain periodicity (TRS) e.g. SSB with certain SSB periodicity. When operating that RLP in relaxed mode the UE measures the RLP-RS for evaluating the signal level (e.g. IS or OOS detection in RLM, or beam failure detection in BM) less frequently than the occurrence of the RLP-RS. FIG. 3 shows an example where the UE is configured with certain CMP (CMP1) which the UE uses to monitor the control channel (e.g. PDCCH) for DL scheduling or UL grant when performing the RLP in normal mode. In this case the control channel resources to monitor occurs with certain periodicity (TCM1). The periodicities, TRS and TCM1 may or may not be the same. FIG. 4 shows an example where the UE is configured with another CMP (CMP2) which the UE uses to monitor the control channel (e.g. PDCCH) when performing the RLP in relaxed mode. In this case the control channel resources to monitor occurs with certain periodicity (TCM2), where TCM2>TCM1. This enables the UE to save its battery power due to the skipping of the baseband processing for control channel monitoring while it is performing RLP in relaxed mode. During this period UE can slow down the clock for baseband processor or shutdown the baseband processor.

In some embodiments, the UE monitors channel based on the channel monitoring pattern. In some examples, upon obtaining information about the CMP the UE monitors the channel (e.g. PDCCH) in the time-frequency resources indicated in the CMP. The monitoring of the channel may comprise for examples tuning its receiver to search for the candidate control channel(s) in the resources (e.g. symbols, slots, RBs etc.) indicated in the CMP.

In additional or alternative examples, the UE may be configured with multiple CMPs e.g. one associated with one or more RLP in relaxed mode, another one associated with one specific RLP in relaxed mode, yet another one associated with RLP in normal mode etc. In relaxed mode, the UE uses the CMP associated with the RLP(s) performed in relaxed mode, to monitor the channel. In normal mode, the UE uses the CMP associated with the RLP(s) performed in normal mode, to monitor the control channel.

In additional or alternative examples, if the UE receives the control channel indicating that it is scheduled (e.g. if the UE is scheduled for transmitting signals in UL and/or receiving signals in DL) then the UE may further adapt the monitoring of the CMP. For example in this case the UE may start monitoring control channel using another CMP, which is to be used upon being scheduled. This CMP can be pre-defined or configured by the NW node. This CMP may for example may require the UE to monitor the control channel more often compared to the previous CMP e.g. one used by the UE prior to being scheduled. In one example, the UE can be configured to receive a wake-up signal indicating whether or not the UE is expected to receive a control channel information in upcoming time resources. If that is the case, the UE may start monitoring the control channel using different CMP (e.g. CMP used in normal operation) which is more stringent than the CMP used in the relaxed RLP mode.

In some embodiments, the UE performs RLPs in relaxed mode. In some examples, the UE further performs one or more RLPs in relaxed mode. In the relaxed mode the UE meets one or more relaxed requirements associated with one or more radio link procedures (RLPs) used in that cell. A relaxed requirement for a certain RLP is the one that is relaxed compared to a certain reference requirement for the same RLP. In one specific example reference requirement is applicable for the RLP when the UE performs that RLP in a normal mode or normal operational mode. As an example the assumed requirement is a measurement time (Tos) (e.g. OOS evaluation period in RLM) for certain RLP (e.g. OOS detection in RLM). In one example the relaxed requirement or relaxing the requirement comprising extending the measurement time (Tos) wrt the reference measurement time (Tos_r) by certain margin. In one specific example Tos=m1*Tos_r; where m1>1 is scaling factor. For example, Tos_r is the requirement to be met by the UE for performing the RLP (e.g. OOS detection in RLM) in the normal mode. In another example assume that the measurement time (Tbfd) (e.g. BFD period) for certain RLP (e.g. BFD detection in beam management or link recover procedure). In one example the relaxed requirement or relaxing the requirement comprising extending the Tbfd wrt the reference measurement time (Tbfd_r) by certain margin. In one specific example Tbfd=m2*Tbdf_r; where m2>1 is scaling factor.

For example, Tbfd_r is the requirement to be met by the UE for performing the RLP (e.g. BFD detection in BM) in the normal mode.

Operations of a communication device will now be discussed with reference to FIG. 8 according to some embodiments of inventive concepts. For example, modules (also referred to as units) may be stored in memory 505 of FIG. 5, and these modules may provide instructions so that when the instructions of a module are executed by processing circuitry 503, processing circuitry 503 performs respective operations of the flow chart of FIG. 8.

FIG. 8 illustrates operations that can be performed by a communication device according to some embodiments. The communication device can be configured to operate in a communications network that includes a network node.

At block 810, processing circuitry 503 determines that the communication device will perform a radio link procedure in a mode of operation. In some embodiments, the UE is configured to perform the RLP using multiple modes of operation including the mode of operation.

In additional or alternative embodiments, determining that the communication device will perform an RLP in the mode of operation includes receiving a message from the network node, the message instructing the communication device to perform the RLP in the mode of operation.

In additional or alternative embodiments, determining that the communication device will perform a RLP in the mode of operation includes selecting the mode of operation from a plurality of modes of operation based on evaluation of criteria. In additional or alternative embodiments, the criteria include at least one of: a mobility of the communication device; a location of the communication device within a cell of the communications network; a variation in radio condition within the cell; a time since performing a cell change; and a time since performing a monitored beam change.

In additional or alternative embodiments, determining that the communication device will perform the RLP in the mode of operation includes transmitting a message to the network node. The message can indicate that the communication device will perform the RLP in a normal mode of operation or in a relaxed mode of operation. In additional or alternative embodiments, the mode of operation is a relaxed mode that includes one or more of: a relaxed measurement period that exceeds a normal measurement period of the normal mode of operation, a relaxed reference signal measurement accuracy level that exceeds a reference signal measurement accuracy level of the normal mode of operation, a relaxed periodicity for sending RLP indications that exceeds a normal periodicity for sending RLP indications of the normal mode operation, and/or a relaxed evaluation period that extends the normal evaluation period of the normal mode of operation.

At block 820, processing circuitry 503 determines information associated with a channel monitoring pattern based on determining that the communication device will perform the radio link procedure in the mode of operation. In some embodiments, determining the information associated with the CMP includes receiving the information associated with the CMP from the network node. In additional or alternative embodiments, determining the information associated with the CMP includes selecting the CMP from a plurality of CMPs based on the CMP being predetermined to be used when the communication device performs the RLP in the mode of operation.

At block 830, processing circuitry 503 monitors a channel between the network node and the communication device based on the information associated with the channel monitoring pattern. In some embodiments, monitoring the channel includes monitoring the channel less often than used while performing the RLP in the normal mode of operation. In additional or alternative embodiments, monitoring the channel includes monitoring only a subset of channel monitoring resources configured compared to the channel monitoring resources configured when performing the RLP in the normal mode of operation.

At block 840, processing circuitry 503 performs the radio link procedure in the relaxed mode of operation. In some embodiments, the relaxed mode of operation includes performing the RLP only on a subset of RLP resources, RLP-RS, compared to the RLP-RS being used to perform the RLP in the normal mode of operation.

In some embodiments, the RLP includes one of a radio link monitoring, RLM, procedure and a beam management, BM, procedure. In additional or alternative embodiments, the channel is a physical downlink control channel, PDCCH.

In additional or alternative embodiments, determining that the communication device will perform the RLP in the mode of operation includes determining that the communication device will perform a plurality of RLPs, including the RLP, in the mode of operation. In additional or alternative embodiments, determining the information associated with the CMP includes determining the CMP based on the plurality of RLPs that will be performed in the mode of operation.

In additional or alternative embodiments, the communications network is a 5th generation, 5G network, and the network node is a radio access network, RAN, node.

Various operations of FIG. 8 may be optional with respect to some embodiments. For example, in regards to Embodiment 1 (described below), block 840 of FIG. 8 may be optional.

Operations of a network node will now be discussed with reference to FIG. 9 according to some embodiments of inventive concepts. For example, modules (also referred to as units) may be stored in memory 605 of FIG. 6, and these modules may provide instructions so that when the instructions of a module are executed by processing circuitry 603, processing circuitry 603 performs respective operations of the flow chart of FIG. 9. Although the operations of FIG. 9 are described as being performed by a RAN network node, the operations can be performed by any suitable network node.

FIG. 9 illustrates operations that can be performed by a network node according to some embodiments. The network node can be a network node configured to operate in a communications network that includes a communication device.

At block 910, processing circuitry 603 determines that the communication device will perform a radio link procedure in a mode of operation. In some embodiments, the UE is configured to perform the RLP using multiple modes of operation including the mode of operation.

In additional or alternative embodiments, determining that the communication device will perform a RLP in the mode of operation includes selecting the mode of operation from a plurality of modes of operation based on evaluation of criteria. In additional or alternative embodiments, the criteria includes at least one of: a mobility of the communication device; a location of the communication device within a cell of the communications network; a variation in radio condition within the cell; a time since performing a cell change; and a time since performing a monitored beam change.

In additional or alternative embodiments, determining that the communication device will perform a RLP in the mode of operation includes receiving a message from the communication device. The message can indicate that the communication device will perform the RLP in the normal mode of operation or in a relaxed mode of operation. In additional or alternative embodiments, the mode of operation is the relaxed mode including one or more of: a relaxed measurement period that exceeds a normal measurement period of the normal mode of operation, a relaxed reference signal measurement accuracy level that exceeds a reference signal measurement accuracy level of the normal mode of operation, a relaxed periodicity for sending RLP indications that exceeds a normal periodicity for sending RLP indications of the normal mode operation, and/or a relaxed evaluation period that extends the normal evaluation period of the normal mode of operation.

At block 920, processing circuitry 603 determines information associated with a channel monitoring patter based on determining that the communication device will perform the radio link procedure in the mode of operation. In some embodiments, determining the information associated with the CMP includes selecting the CMP from a plurality of CMPs based on the CMP being predetermined to be used when the communication device performs the RLP in the mode of operation.

At block 930, processing circuitry 603 transmits, via transceiver 601, a message to the communication device including information associated with at least one of: performing the radio link procedure and the channel monitoring pattern. In some embodiments, transmitting the message includes instructing the communication device to monitor a channel between the communication device and the network node at a lower rate than used while performing the RLP in the normal mode of operation. In additional or alternative embodiments, transmitting the message includes instructing the communication device to monitor only a subset of channel monitoring resources configured compared to the channel monitoring resources configured when performing the RLP in the normal mode of operation. In additional or alternative embodiments, transmitting the message includes instructing the communication device to perform the RLP in the mode of operation.

In additional or alternative embodiments, the RLP includes one of a radio link monitoring, RLM, procedure and a beam management, BM, procedure. In additional or alternative embodiments, the channel is a physical downlink control channel, PDCCH.

In additional or alternative embodiments, determining that the communication device will perform the RLP in the mode of operation includes determining that the communication device will perform a plurality of RLPs, including the RLP, in the mode of operation. In additional or alternative embodiments, determining the information associated with the CMP includes determining the CMP based on the plurality of RLPs that will be performed in the mode of operation.

In additional or alternative embodiments, the communications network is a 5th generation, 5G network, and the network node is a radio access network, RAN, node.

Various operations of FIG. 9 may be optional with respect to some embodiments.

Example Embodiments are included below.

Embodiment 1. A method, performed by a communication device configured to operate in a communications network that includes a network node, the method comprising:

determining (810) that the communication device will perform a radio link procedure, RLP, in a mode of operation;

determining (820) information associated with a channel monitoring pattern, CMP, based on determining that the communication device will perform the RLP in the mode of operation; and monitoring (830) a channel between the network node and the communication device based on the information associated with the CMP.

Embodiment 2. The method of Embodiment 2, wherein the communication device is configured with a plurality of modes of operation including the mode of operation, and wherein determining that the communication device will perform the RLP in the mode of operation comprises determining that the communication device will perform the RLP in the mode of operation from the plurality of modes of operation.

Embodiment 3. The method of any of Embodiments 1-2, wherein determining that the communication device will perform the RLP in the mode of operation comprises:

transmitting a message to the network node, the message indicating that the communication device will perform the RLP in a normal mode of operation or in a relaxed mode of operation.

Embodiment 4. The method of any of Embodiments 1-3, wherein the mode of operation is a relaxed mode comprising one or more of:

a relaxed measurement period that exceeds a normal measurement period of the normal mode of operation, a relaxed reference signal measurement accuracy level that exceeds a reference signal measurement accuracy level of the normal mode of operation, a relaxed periodicity for sending RLP indications that exceeds a normal periodicity for sending RLP indications of the normal mode operation, and/or a relaxed evaluation period that extends the normal evaluation period of the normal mode of operation.

Embodiment 5. The method of Embodiment 4, wherein monitoring the channel comprises monitoring the channel less often than while performing the RLP in the normal mode of operation.

Embodiment 6. The method of any of Embodiments 4-5, wherein monitoring the channel comprises monitoring only a subset of channel monitoring resources configured compared to the channel monitoring resources configured when performing the RLP in the normal mode of operation.

Embodiment 7. The method of any of Embodiments 4-6, further comprising:

performing (840) the RLP in the relaxed mode of operation, wherein performing the RLP in the relaxed mode of operation comprises performing the RLP only on a subset of RLP resources, RLP-RS, compared to the RLP-RS being used to perform the RLP in the normal mode of operation.

Embodiment 8. The method of any of Embodiments 1-7, wherein the RLP comprises one of a radio link monitoring, RLM, procedure and a beam management, BM, procedure.

Embodiment 9. The method of any of Embodiments 1-8, wherein the channel is a physical downlink control channel, PDCCH.

Embodiment 10. The method of any of Embodiments 1-9, wherein determining that the communication device will perform an RLP in the mode of operation comprises receiving a message from the network node, the message instructing the communication device to perform the RLP in the mode of operation.

Embodiment 11. The method of any of Embodiments 1-10, wherein determining that the communication device will perform a RLP in the mode of operation comprises selecting the mode of operation from a plurality of modes of operation based on evaluation of criteria.

Embodiment 12. The method of Embodiment 11, wherein the criteria comprise at least one of: a mobility of the communication device; a location of the communication device within a cell of the communications network; a variation in radio condition within the cell; a time since performing a cell change; and a time since performing a monitored beam change.

Embodiment 13. The method of any of Embodiments 1-12, wherein determining the information associated with the CMP comprises receiving the information associated with the CMP from the network node.

Embodiment 14. The method of any of Embodiments 1-13, wherein determining the information associated with the CMP comprises selecting the CMP from a plurality of CMPs based on the CMP being predetermined to be used when the communication device performs the RLP in the mode of operation.

Embodiment 15. The method of any of Embodiments 1-14, wherein determining that the communication device will perform the RLP in the mode of operation comprises determining that the communication device will perform a plurality of RLPs, including the RLP, in the mode of operation, and wherein determining the information associated with the CMP comprises determining the CMP based on the plurality of RLPs that will be performed in the mode of operation.

Embodiment 16. The method of any of Embodiments 1-15, wherein the communications network is a $5^{th}$ generation, 5G network, and wherein the network node is a radio access network, RAN, node.

Embodiment 17. A method of operating a network node configured to operate in a communications network that includes a communication device, the method comprising:
 determining (910) that the communication device will perform a radio link procedure, RLP, in a mode of operation;
 determining (920) information associated with a channel monitoring pattern, CMP, based on determining that the communication device will perform the RLP in the mode of operation; and
 transmitting (930) a message to the communication device, the message including information associated with at least one of: performing the RLP in the mode of operation, and the CMP.

Embodiment 18. The method of Embodiment 17, wherein the communication device is configured with a plurality of modes of operation, and
 wherein determining that the communication device will perform the in the mode of operation comprises determining that the communication device will perform the in the mode of operation from the plurality of modes of operation.

Embodiment 19. The method of any of Embodiments 17-18, wherein determining that the communication device will perform a RLP in the mode of operation comprises:
 receiving a message from the communication device, the message indicating that the communication device will perform the RLP in a normal mode of operation or in a relaxed mode of operation.

Embodiment 20. The method of any of Embodiments 17-19, wherein the mode of operation is the relaxed mode comprising one or more of:
 a relaxed measurement period that exceeds a normal measurement period of the normal mode of operation,
 a relaxed reference signal measurement accuracy level that exceeds a reference signal measurement accuracy level of the normal mode of operation,
 a relaxed periodicity for sending RLP indications that exceeds a normal periodicity for sending RLP indications of the normal mode operation, and/or
 a relaxed evaluation period that extends the normal evaluation period of the normal mode of operation.

Embodiment 21. The method of Embodiments 20, wherein transmitting the message comprises instructing the communication device to monitor a channel between the communication device and the network node at a lower rate than used while performing the RLP in the normal mode of operation.

Embodiment 22. The method of any of Embodiments 20-21, wherein transmitting the message comprises instructing the communication device to monitor only a subset of channel monitoring resources configured compared to the channel monitoring resources configured when performing the RLP in the normal mode of operation.

Embodiment 23. The method of any of Embodiments 17-22, wherein the RLP comprises one of a radio link monitoring, RLM, procedure and a beam management, BM, procedure.

Embodiment 24. The method of any of Embodiments 17-23, wherein the channel is a physical downlink control channel, PDCCH.

Embodiment 25. The method of any of Embodiments 17-24, wherein transmitting the message comprises instructing the communication device to perform the RLP in the mode of operation.

Embodiment 26. The method of any of Embodiments 17-25, wherein determining that the communication device will perform a RLP in the mode of operation comprises selecting the mode of operation from a plurality of modes of operation based on evaluation of criteria.

Embodiment 27. The method of Embodiment 26, wherein the criteria comprise at least one of: a mobility of the communication device; a location of the communication device within a cell of the communications network; a variation in radio condition within the cell; a time since performing a cell change; and a time since performing a monitored beam change.

Embodiment 28. The method of any of Embodiments 17-26, wherein determining the information associated with the CMP comprises selecting the CMP from a plurality of CMPs based on the CMP being predetermined to be used when the communication device performs the RLP in the mode of operation.

Embodiment 29. The method of any of Embodiments 17-28, wherein determining that the communication device will perform the RLP in the mode of operation comprises determining that the communication device will perform a plurality of RLPs, including the RLP, in the mode of operation, and
 wherein determining the information associated with the CMP comprises determining the CMP based on the plurality of RLPs that will be performed in the mode of operation.

Embodiment 30. The method of any of Embodiments 17-29, wherein the communications network is a 5th generation, 5G network, and wherein the network node is a radio access network, RAN, node.

Embodiment 31. A communication device (500) configured to operate in a communications network that includes a network node, the communication device comprising:
processing circuitry (503); and
memory (505) coupled to the processing circuitry and having instructions stored therein that are executable by the processing circuitry to cause the communication device to perform operations comprising:
determining (810) that the communication device will perform a radio link procedure, RLP, in a mode of operation;
determining (820) information associated with a channel monitoring pattern, CMP, based on determining that the communication device will perform the RLP in the mode of operation; and
monitoring (830) a channel between the network node and the communication device based on the information associated with the CMP.

Embodiment 32. The communication device of Embodiment 31, the operations further comprising any of the operations of Embodiments 2-16.

Embodiment 33. A network node (600) configured to operate in a communications network that includes a communication device, the network node comprising:
processing circuitry (603); and
memory (605) coupled to the processing circuitry and having instructions stored therein that are executable by the processing circuitry to cause the network node to perform operations comprising:
determining (910) that the communication device will perform a radio link procedure, RLP, in a mode of operation;
determining (920) information associated with a channel monitoring pattern, CMP, based on determining that the communication device will perform the RLP in the mode of operation; and
transmitting (930) a message to the communication device, the message including information associated with at least one of: performing the RLP in the mode of operation, and the CMP.

Embodiment 34. The network node of Embodiment 33, the operations further comprising any of the operations of Embodiments 18-30.

Embodiment 35. A communication device (500) configured to operate in a communications network that includes a network node, the communication device adapted to perform operations comprising:
determining (810) that the communication device will perform a radio link procedure, RLP, in a mode of operation;
determining (820) information associated with a channel monitoring pattern, CMP, based on determining that the communication device will perform the RLP in the mode of operation; and
monitoring (830) a channel between the network node and the communication device based on the information associated with the CMP.

Embodiment 36. The communication device of Embodiment 35, further adapted to perform any of the operations of Embodiments 2-16.

Embodiment 37. A network node (600) configured to operate in a communications network that includes a communication device, the network node adapted to perform operations comprising:
determining (910) that the communication device will perform a radio link procedure, RLP, in a mode of operation;
determining (920) information associated with a channel monitoring pattern, CMP, based on determining that the communication device will perform the RLP in the mode of operation; and
transmitting (930) a message to the communication device, the message including information associated with at least one of: performing the RLP in the mode of operation, and the CMP.

Embodiment 38. The network node of Embodiment 37, further adapted to perform any of the operations of Embodiments 18-30.

Embodiment 39. A computer program comprising program code to be executed by processing circuitry (503) of a communication device (500) configured to operate in a communications network that includes a network node, whereby execution of the program code causes the communication device to perform operations comprising:
determining (810) that the communication device will perform a radio link procedure, RLP, in a mode of operation;
determining (820) information associated with a channel monitoring pattern, CMP, based on determining that the communication device will perform the RLP in the mode of operation; and
monitoring (830) a channel between the network node and the communication device based on the information associated with the CMP.

Embodiment 40. The computer program code of Embodiment 41, the operations further comprising any of the operations of Embodiments 2-16.

Embodiment 41. A computer program comprising program code to be executed by processing circuitry (603) of a network node (600) configured to operate in a communications network that includes a communication device, whereby execution of the program code causes the network node to perform operations comprising:
determining (910) that the communication device will perform a radio link procedure, RLP, in a mode of operation;
determining (920) information associated with a channel monitoring pattern, CMP, based on determining that the communication device will perform the RLP in the mode of operation; and
transmitting (930) a message to the communication device, the message including information associated with at least one of: performing the RLP in the mode of operation, and the CMP.

Embodiment 42. The computer program of Embodiment 41, the operations further comprising any of the operations of Embodiments 18-30.

Embodiment 43. A computer program product comprising a non-transitory storage medium including program code to be executed by processing circuitry (503) of a communication device (500) configured to operate in a communications network that includes a network node, whereby execution of the program code causes the communication device to perform operations comprising:
determining (810) that the communication device will perform a radio link procedure, RLP, in a mode of operation;
determining (820) information associated with a channel monitoring pattern, CMP, based on determining that the communication device will perform the RLP in the mode of operation; and monitoring (830) a channel between the network node and the communication device based on the information associated with the CMP.

Embodiment 44. The computer program product of Embodiment 42, the operations further comprising any of the operations of Embodiments 2-16.

Embodiment 45. A computer program product comprising a non-transitory storage medium including program code to be executed by processing circuitry (603) of a network node (600) configured to operate in a communications network that includes a communication device, whereby execution of the program code causes the network node to perform operations comprising:
- determining (910) that the communication device will perform a radio link procedure, RLP, in a mode of operation;
- determining (920) information associated with a channel monitoring pattern, CMP, based on determining that the communication device will perform the RLP in the mode of operation; and
- transmitting (930) a message to the communication device, the message including information associated with at least one of: performing the RLP in the mode of operation, and the CMP.

Embodiment 46. The computer program product of Embodiment the operations further comprising any of the operations of Embodiments 18-30.

Explanations for abbreviations from the above disclosure are provided below.

Abbreviation Explanation

ARFCN Absolute radio frequency channel number
BFD Beam failure detection
BM Beam management
BS Base station
CBD Candidate beam detection
CE Control element
CGI Cell global ID
CMP Channel monitoring pattern
CORESET Control resource set
CRS Cell-specific reference signals
CSI Channel state information
CSI-RS Channel state information reference signals
DC Dual connectivity
DCI Downlink control information
DL Downlink
FDD Frequency division duplex
FR1 Frequency range 1
FR2 Frequency range 2
GSCN Global synchronization channel number
gNB Next generation Node B
HARQ Hybrid automatic repeat request
IS In-sync
LTE Long term evolution
MAC Medium access control
MC Multi-carrier
MuC Multi-connectivity
NR New radio
OOS Out-of-sync
PBCH Physical broadcast channel
PCI Physical cell ID
PDCCH Physical downlink control channel
PDSCH Physical downlink shared channel
PSS Primary synchronization signal
PUCCH Physical uplink control channel
PUSCH Physical uplink shared channel
RACH Rando access channel
RAT Radio access technology
RLM Radio link monitoring
RLP Radio link procedure
RRC Radio resource control
RSRP Received signal reference power
RSRQ Received signal reference quality
SCH Shared channel
SNR Signal to noise ratio
SRS Sounding reference signal
SS-RSRP Secondary synchronization RSRP
SS-RSRQ Secondary synchronization RSRQ
SSS Secondary synchronization signal
TCI Transmission configuration indicator Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
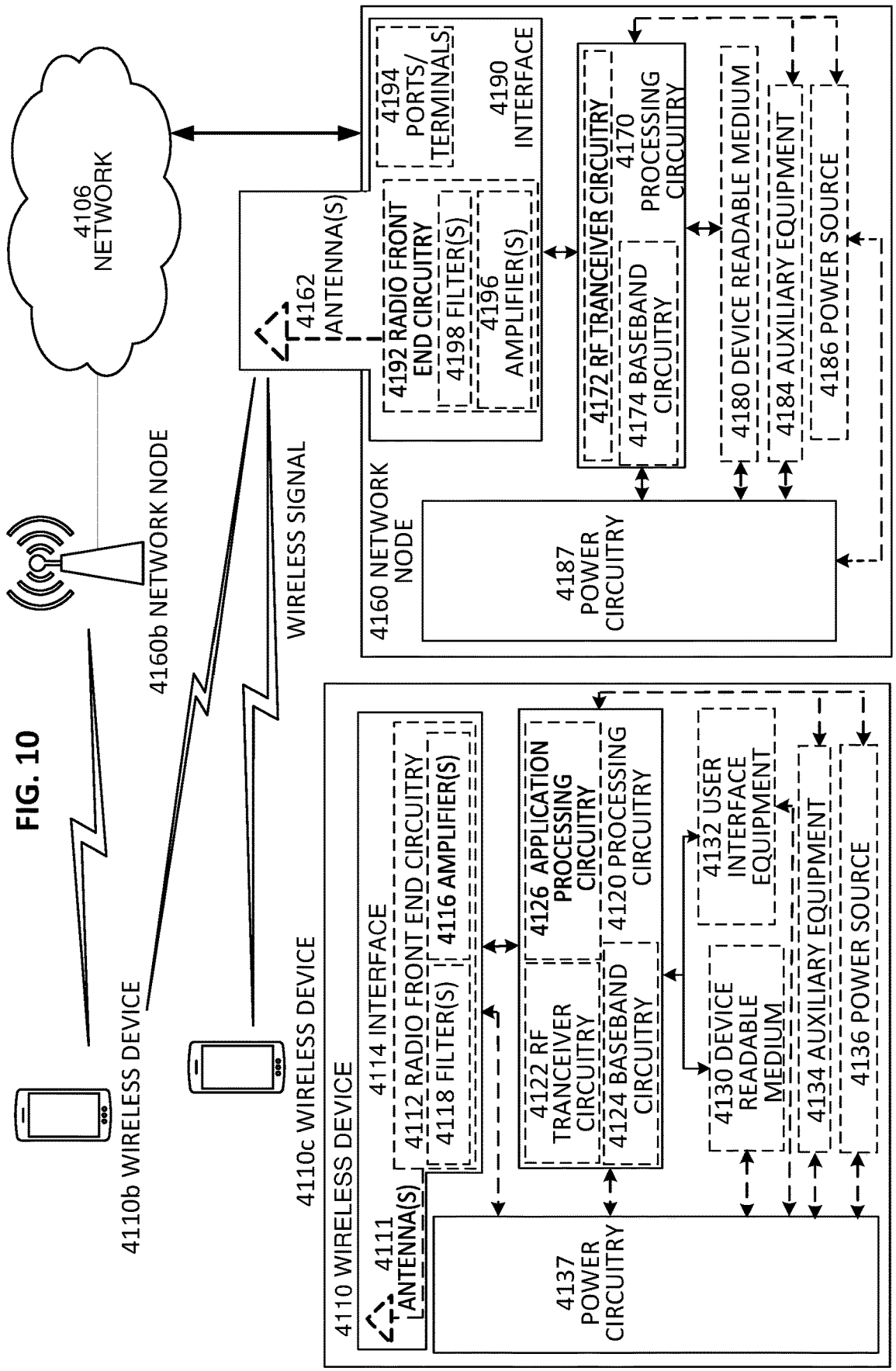
FIG. 10 is a block diagram of a wireless network in accordance with some embodiments.

FIG. 10 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 10 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (I) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal.

Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 11:
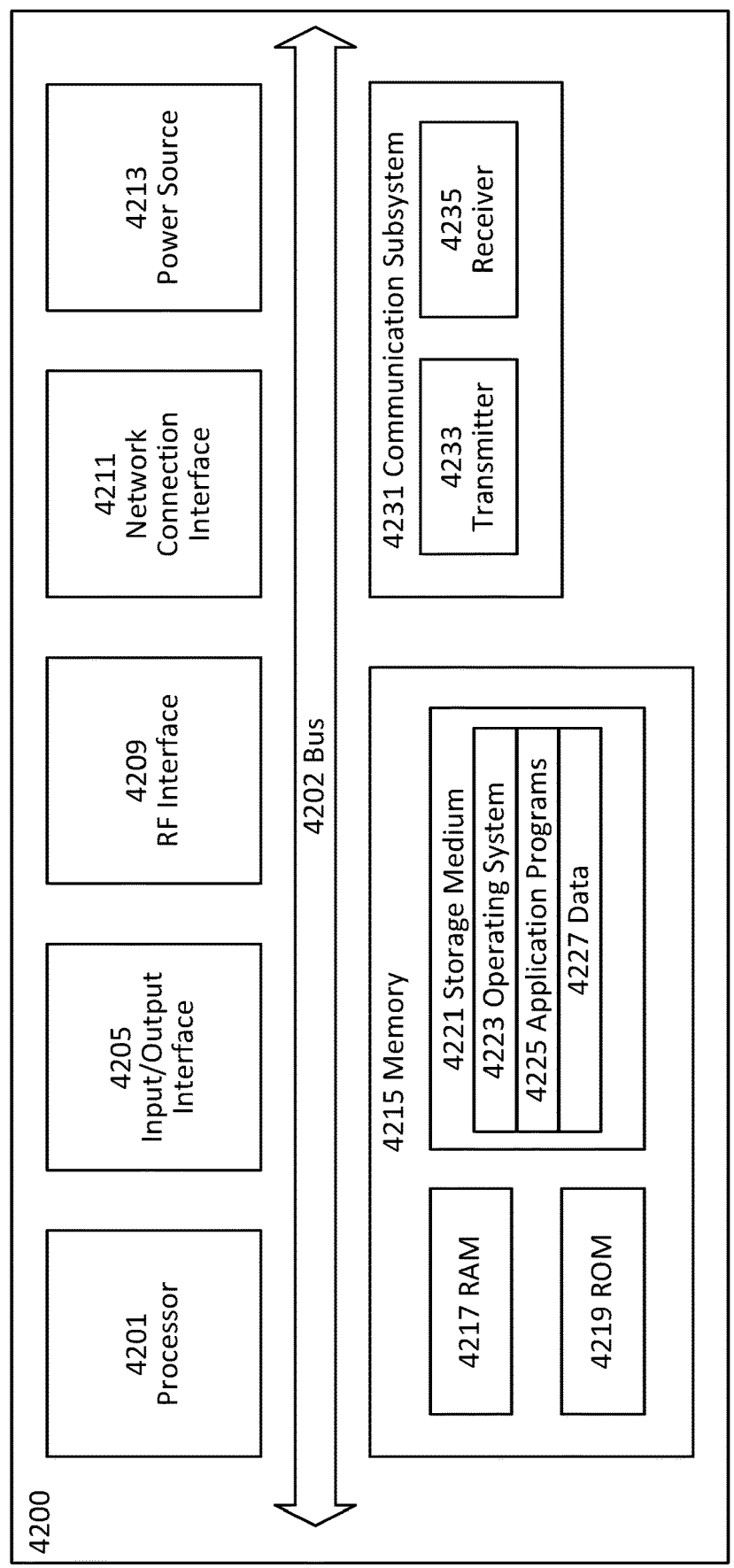
FIG. 11 is a block diagram of a user equipment in accordance with some embodiments

FIG. 11 illustrates a user Equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 11, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 12:
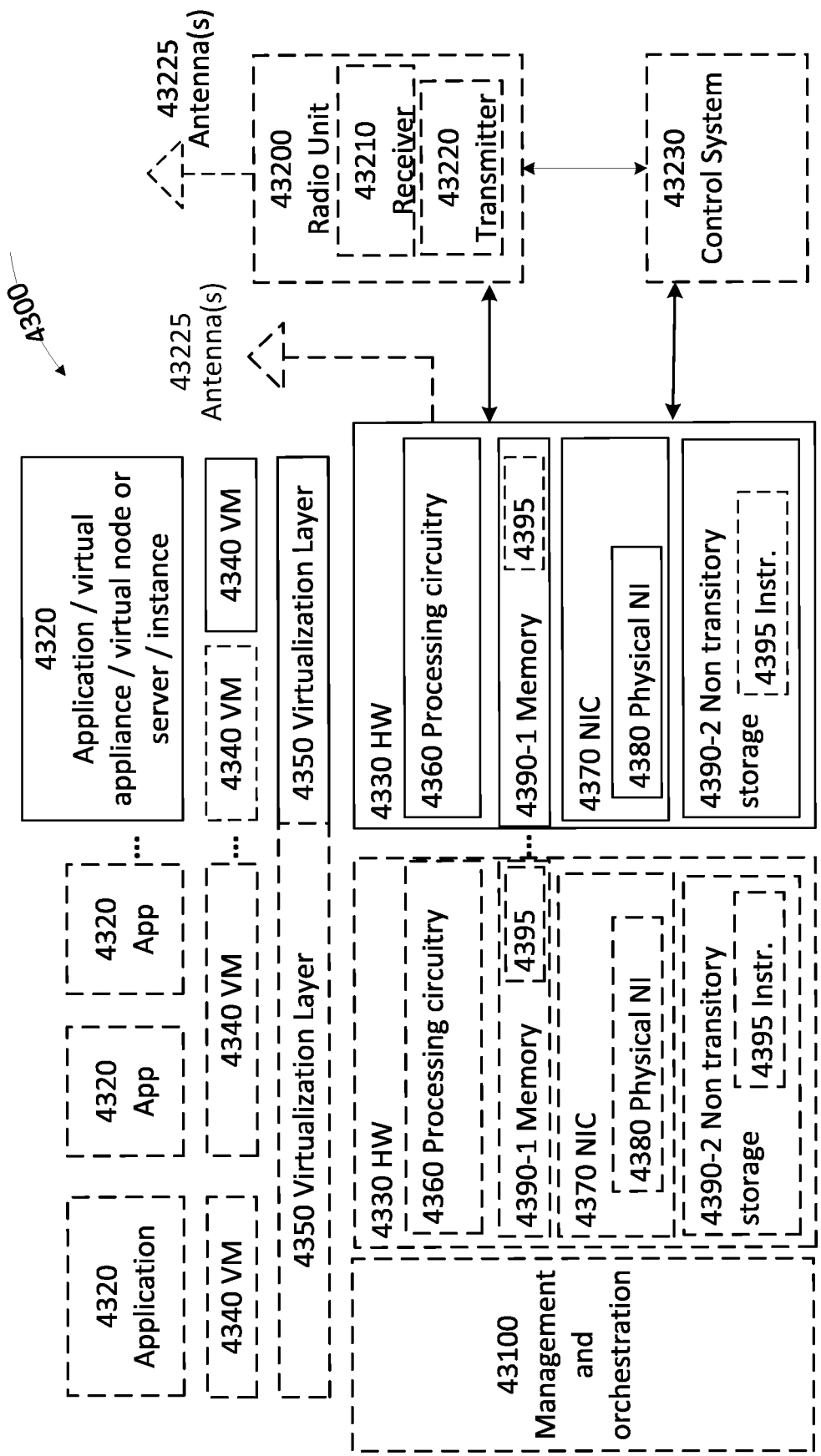
FIG. 12 is a block diagram of a virtualization environment in accordance with some embodiments.

FIG. 12 illustrates a virtualization environment in accordance with some embodiments.

FIG. 12 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 12, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 12.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 13:
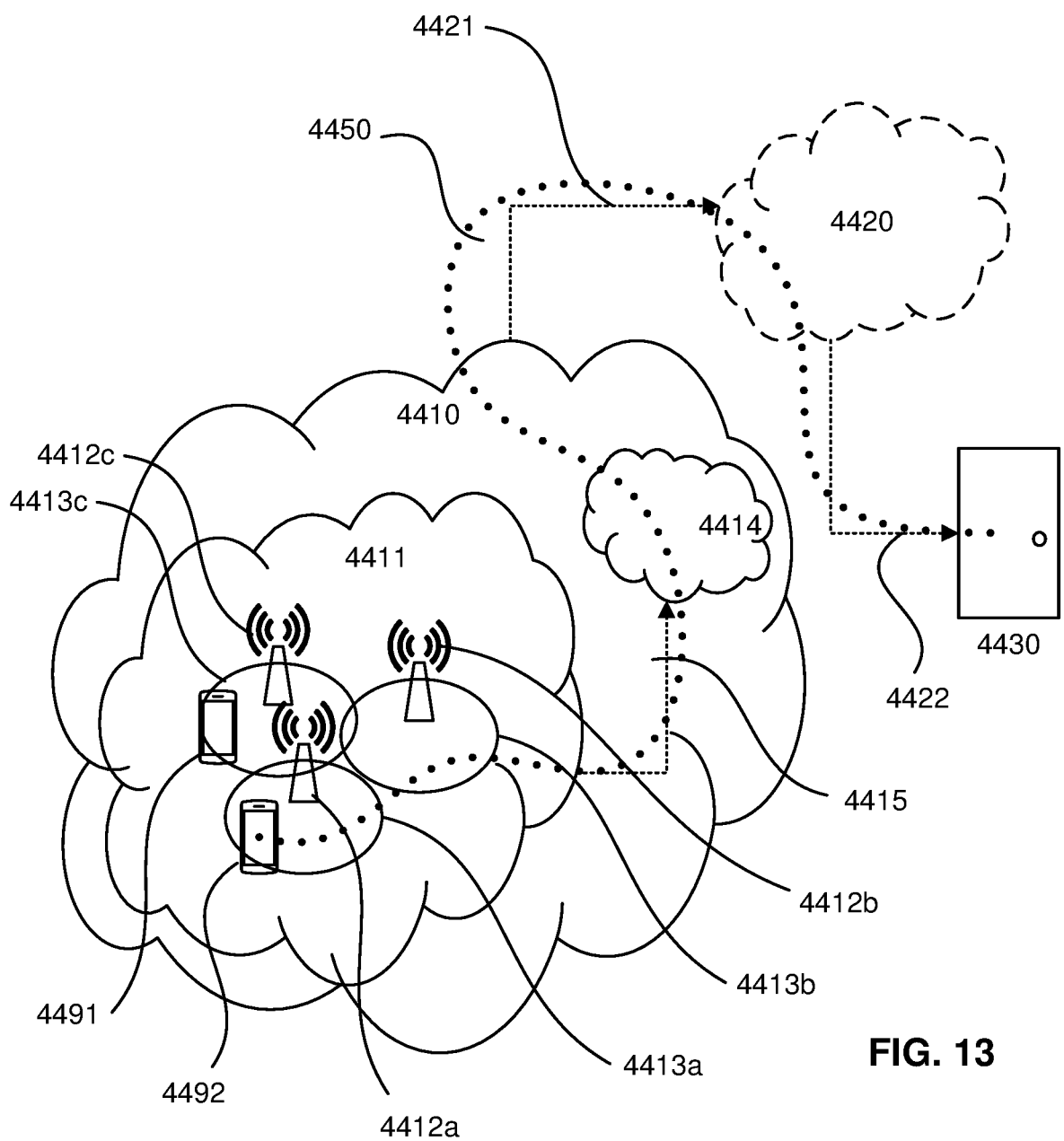
FIG. 13 is a block diagram of a telecommunication network connected via an intermediate network to a host computer in accordance with some embodiments.

FIG. 13 illustrates a telecommunication network connected via an intermediate network to a host computer in accordance with some embodiments.

With reference to FIG. 13, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 13 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 14:
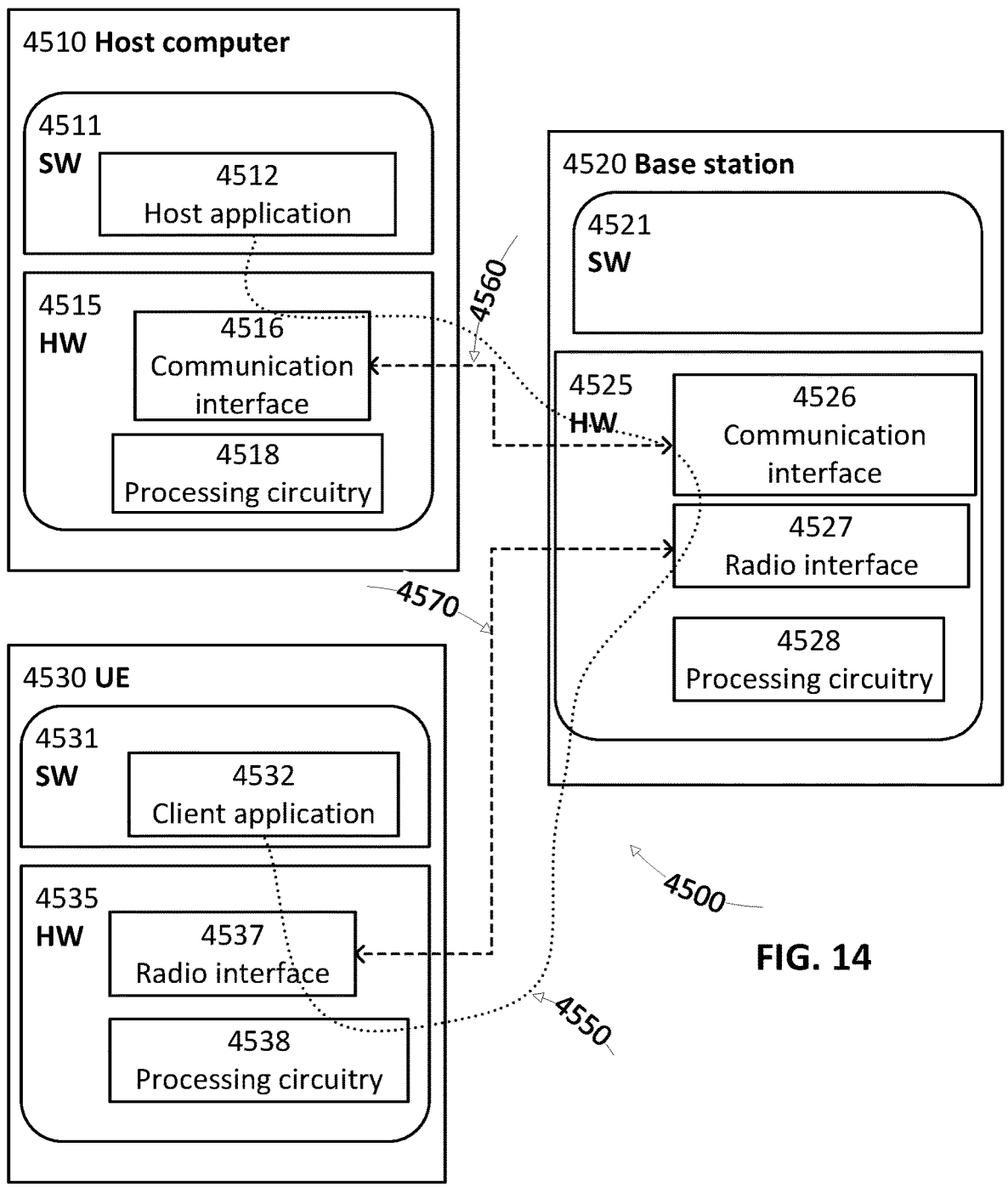
FIG. 14 is a block diagram of a host computer communicating via a base station with a user equipment over a partially wireless connection in accordance with some embodiments.

FIG. 14 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 14) served by base station 4520. Communication interface 4526 may be configured to facilitate connection 4560 to host computer 4510. Connection 4560 may be direct or it may pass through a core network (not shown in FIG. 14) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 14 may be similar or identical to host computer 4430, one of base stations 4412a, 4412b, 4412c and one of UEs 4491, 4492 of FIG. 13, respectively. This is to say, the inner workings of these entities may be as shown in FIG. 14 and independently, the surrounding network topology may be that of FIG. 13.

In FIG. 14, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 15, 16:
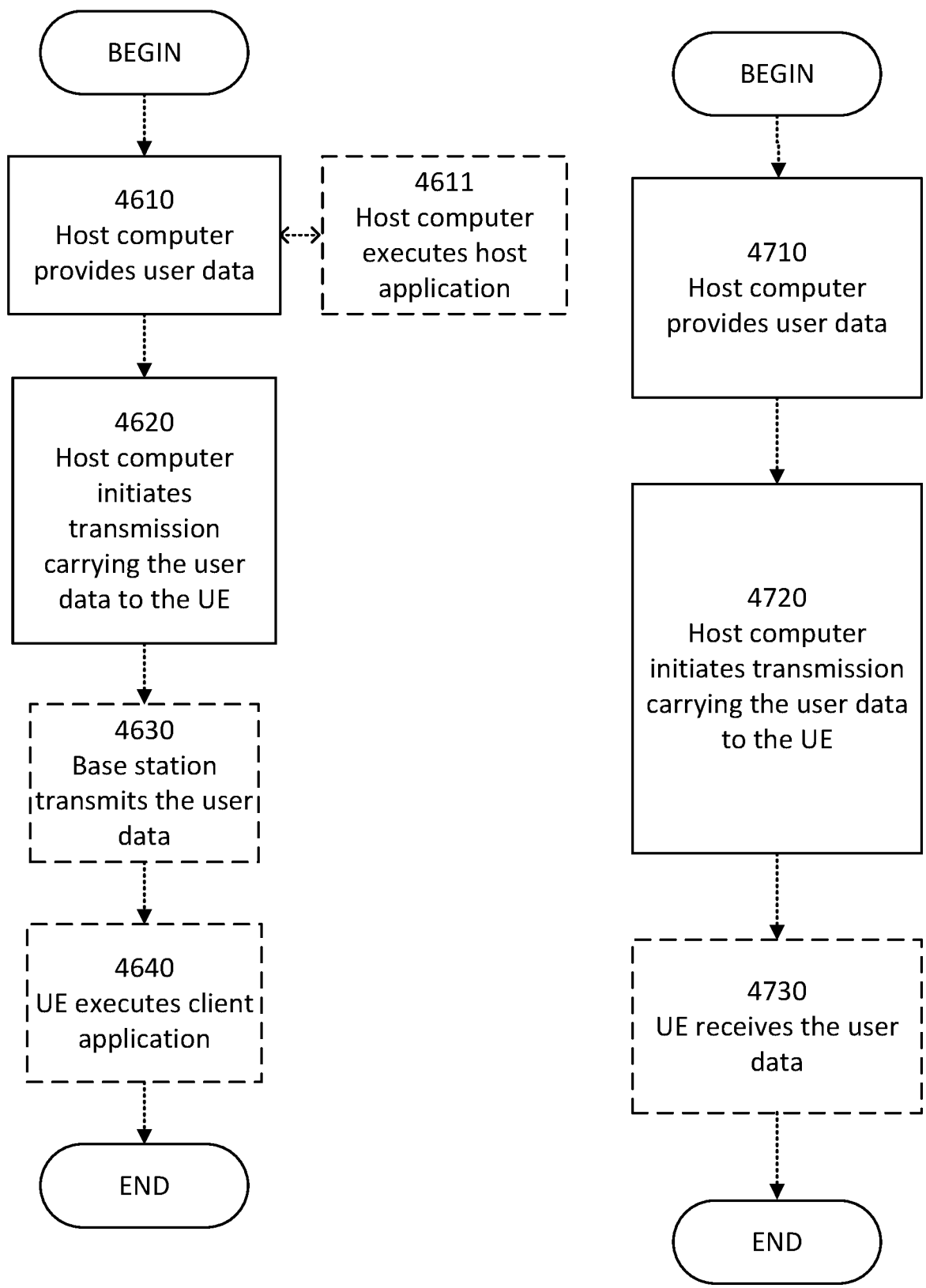
FIG. 15 is a block diagram of methods implemented in a communication system including a host computer, a base station, and a user equipment in accordance with some embodiments.
FIG. 16 is a block diagram of methods implemented in a communication system including a host computer, a base station, and a user equipment in accordance with some embodiments.

FIG. 15 illustrates methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 13-14. For simplicity of the present disclosure, only drawing references to FIG. 15 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13-14. For simplicity of the present disclosure, only drawing references to FIG. 16 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 13-14. For simplicity of the present disclosure, only drawing references to FIG. 17 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 13-14. For simplicity of the present disclosure, only drawing references to FIG. 18 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method, performed by a communication device configured to operate in a communications network that includes a network node, the method comprising:
   determining that the communication device will perform a radio link procedure, RLP, in a mode of operation;
   determining information associated with a channel monitoring pattern, CMP, based on determining that the communication device will perform the RLP in the mode of operation; and
   monitoring a channel between the network node and the communication device based on the information associated with the CMP.

2. The method of claim 1, wherein the communication device is configured with a plurality of modes of operation including the mode of operation, and
   wherein determining that the communication device will perform the RLP in the mode of operation comprises determining that the communication device will perform the RLP in the mode of operation from the plurality of modes of operation.

3. The method of claim 1, wherein determining that the communication device will perform the RLP in the mode of operation comprises:
   transmitting a message to the network node, the message indicating that the communication device will perform the RLP in a normal mode of operation or in a relaxed mode of operation.

4. The method of claim 1, wherein the mode of operation is a relaxed mode comprising one or more of:
   a relaxed measurement period that exceeds a normal measurement period of the normal mode of operation,
   a relaxed reference signal measurement accuracy level that exceeds a reference signal measurement accuracy level of the normal mode of operation,
   a relaxed periodicity for sending RLP indications that exceeds a normal periodicity for sending RLP indications of the normal mode operation, and/or
   a relaxed evaluation period that extends the normal evaluation period of the normal mode of operation.

5. The method of claim 4, wherein monitoring the channel comprises at least one of:
   monitoring the channel less often than while performing the RLP in the normal mode of operation; and
   monitoring only a subset of channel monitoring resources configured compared to the channel monitoring resources configured when performing the RLP in the normal mode of operation.

6. The method of claim 1, wherein determining that the communication device will perform an RLP in the mode of operation comprises receiving a message from the network node, the message instructing the communication device to perform the RLP in the mode of operation.

7. The method of claim 1, wherein determining that the communication device will perform an RLP in the mode of operation comprises selecting the mode of operation from a plurality of modes of operation based on evaluation of criteria, and the criteria comprise at least one of: a mobility of the communication device; a location of the communication device within a cell of the communications network; a variation in radio condition within the cell; a time since performing a cell change; a time since performing a monitored beam change; and a current radio condition, a signal quality, a signal strength, or a discontinuous reception, DRX, length compared to a threshold value.

8. The method of claim 1, wherein determining the information associated with the CMP comprises receiving the information associated with the CMP from the network node.

9. The method of claim 1, wherein determining the information associated with the CMP comprises selecting the CMP from a plurality of CMPs based on the CMP being predetermined to be used when the communication device performs the RLP in the mode of operation.

10. The method of claim 1, wherein determining that the communication device will perform the RLP in the mode of operation comprises determining that the communication device will perform a plurality of RLPs, including the RLP, in the mode of operation, and wherein determining the information associated with the CMP comprises determining the CMP based on the plurality of RLPs that will be performed in the mode of operation.

11. A method of operating a network node configured to operate in a communications network that includes a communication device, the method comprising:

determining that the communication device will perform a radio link procedure, RLP, in a mode of operation;

determining information associated with a channel monitoring pattern, CMP, based on determining that the communication device will perform the RLP in the mode of operation; and transmitting a message to the communication device, the message including information associated with at least one of: performing the RLP in the mode of operation, and the CMP.

12. The method of claim 11, wherein determining that the communication device will perform a RLP in the mode of operation comprises:

receiving a message from the communication device, the message indicating that the communication device will perform the RLP in a normal mode of operation or in a relaxed mode of operation.

13. The method of claim 11, wherein the mode of operation is the relaxed mode comprising one or more of:

a relaxed measurement period that exceeds a normal measurement period of the normal mode of operation, a relaxed reference signal measurement accuracy level that exceeds a reference signal measurement accuracy level of the normal mode of operation, a relaxed periodicity for sending RLP indications that exceeds a normal periodicity for sending RLP indications of the normal mode operation, and/or a relaxed evaluation period that extends the normal evaluation period of the normal mode of operation.

14. The method of claim 13, wherein transmitting the message comprises at least one of:

instructing the communication device to monitor a channel between the communication device and the network node at a lower rate than used while performing the RLP in the normal mode of operation; and instructing the communication device to monitor only a subset of channel monitoring resources configured compared to the channel monitoring resources configured when performing the RLP in the normal mode of operation.

15. The method of claim 11, wherein transmitting the message comprises instructing the communication device to perform the RLP in the mode of operation.

16. The method of claim 11, wherein determining that the communication device will perform a RLP in the mode of operation comprises selecting the mode of operation from a plurality of modes of operation based on evaluation of criteria, and the criteria comprise at least one of: a mobility of the communication device; a location of the communication device within a cell of the communications network; a variation in radio condition within the cell; a time since performing a cell change; a time since performing a monitored beam change; and a current radio condition, a signal quality, a signal strength, or a discontinuous reception, DRX, length compared to a threshold value.

17. The method of claim 11, wherein determining the information associated with the CMP comprises selecting the CMP from a plurality of CMPs based on the CMP being predetermined to be used when the communication device performs the RLP in the mode of operation.

18. The method of claim 11, wherein determining that the communication device will perform the RLP in the mode of operation comprises determining that the communication device will perform a plurality of RLPs, including the RLP, in the mode of operation, and wherein determining the information associated with the CMP comprises determining the CMP based on the plurality of RLPs that will be performed in the mode of operation.

19. A communication device configured to operate in a communications network that includes a network node, the communication device comprising:

processing circuitry; and memory coupled to the processing circuitry and having instructions stored therein that are executable by the processing circuitry to cause the communication device to perform any of the operations of claim 1.

20. A network node configured to operate in a communications network that includes a communication device, the network node comprising:

processing circuitry; and memory coupled to the processing circuitry and having instructions stored therein that are executable by the processing circuitry to cause the network node to perform any of the operations of claim 11.

* * * * *